United States Patent
Meredith et al.

(10) Patent No.: US 8,923,134 B2
(45) Date of Patent: Dec. 30, 2014

(54) PRIORITIZING NETWORK FAILURE TICKETS USING MOBILE LOCATION DATA

(75) Inventors: Sheldon Meredith, Marietta, GA (US);
John Pastore, Suwanee, GA (US);
Douglas T. Sanders, Lilburn, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 45 days.

(21) Appl. No.: 13/219,911

(22) Filed: Aug. 29, 2011

(65) Prior Publication Data
US 2013/0051239 A1     Feb. 28, 2013

(51) Int. Cl.
*H04W 80/04* (2009.01)
*H04W 24/08* (2009.01)

(52) U.S. Cl.
CPC .............. *G04W 16/18* (2013.01); *H04W 24/08* (2013.01)
USPC ............................ 370/241; 370/252; 456/423

(58) Field of Classification Search
CPC ..... H04W 80/04; H04W 84/12; H04W 24/00; H04L 43/50
USPC .......................... 370/241, 252, 331, 348, 242; 455/456.1, 423, 403
See application file for complete search history.

(56) References Cited

U.S. PATENT DOCUMENTS

| | | |
|---|---|---|
| 5,515,062 A | 5/1996 | Maine et al. |
| 5,724,660 A | 3/1998 | Kauser et al. |
| 5,732,354 A | 3/1998 | MacDonald |
| 5,732,383 A | 3/1998 | Foladare et al. |
| 5,844,521 A | 12/1998 | Stephens et al. |
| 5,982,324 A | 11/1999 | Watters et al. |
| 6,018,312 A | 1/2000 | Haworth et al. |
| 6,026,301 A | 2/2000 | Satarasinghe |

(Continued)

FOREIGN PATENT DOCUMENTS

| | | |
|---|---|---|
| EP | 0856746 A2 | 8/1998 |
| JP | 2004069609 | 3/2004 |
| JP | 2007328050 A | 12/2007 |
| WO | 2006031035 A1 | 3/2006 |

OTHER PUBLICATIONS

Fleishman. Using the Personal Hotspot on your AT & T iPhone. Published online Mar. 15, 2011. http://www.macworld.com/article/158556/2011/03/personal_hotspot_att . . . , 4 pages.

(Continued)

*Primary Examiner* — Thai Nguyen
*Assistant Examiner* — Hien Nguyen
(74) *Attorney, Agent, or Firm* — Amin, Turocy & Watson, LLP

(57) ABSTRACT

Providing for network repair prioritization as a function of impact on network services is described herein. By way of example, impact of a given service outage on surrounding network infrastructure and associated terminals can be analyzed and estimated. The impact can be characterized at least in part by changes in loading to surrounding network equipment, as well as related quality and performance metrics. Network impact estimates and loading changes can be derived through mobile device position data for an impacted area and identifying overlapping coverage areas, and signal characteristics of the surrounding network infrastructure. Measured or predicted changes in network performance can be scored to provide relative priorities for allocating limited service personnel in repairing base station errors. Personnel resources can therefore be deployed in a manner that more accurately reflects customer service goals of a network provider.

20 Claims, 11 Drawing Sheets

(56) References Cited

U.S. PATENT DOCUMENTS

| | | | |
|---|---|---|---|
| 6,108,532 A | 8/2000 | Matsuda et al. | |
| 6,108,556 A | 8/2000 | Ito | |
| 6,148,219 A | 11/2000 | Engelbrecht et al. | |
| 6,230,018 B1 | 5/2001 | Watters et al. | |
| 6,256,577 B1 | 7/2001 | Graunke | |
| 6,263,190 B1 | 7/2001 | Mamori et al. | |
| 6,298,233 B1* | 10/2001 | Souissi et al. | 455/423 |
| 6,307,503 B1 | 10/2001 | Liu et al. | |
| 6,311,078 B1 | 10/2001 | Hardouin et al. | |
| 6,317,686 B1 | 11/2001 | Ran et al. | |
| 6,330,459 B1 | 12/2001 | Crichton et al. | |
| 6,351,235 B1 | 2/2002 | Stilp | |
| 6,353,778 B1 | 3/2002 | Brown et al. | |
| 6,397,074 B1 | 5/2002 | Pihl et al. | |
| 6,407,703 B1 | 6/2002 | Minter et al. | |
| 6,429,815 B1 | 8/2002 | Soliman | |
| 6,434,396 B1 | 8/2002 | Rune | |
| 6,453,168 B1 | 9/2002 | McCrady et al. | |
| 6,515,623 B2 | 2/2003 | Johnson | |
| 6,522,296 B2 | 2/2003 | Holt | |
| 6,526,335 B1 | 2/2003 | Treyz et al. | |
| 6,560,532 B2 | 5/2003 | Cayford | |
| 6,560,567 B1 | 5/2003 | Yechuri et al. | |
| 6,594,576 B2 | 7/2003 | Fan et al. | |
| 6,604,083 B1 | 8/2003 | Bailey et al. | |
| 6,668,226 B2 | 12/2003 | Sutanto et al. | |
| 6,690,292 B1 | 2/2004 | Meadows et al. | |
| 6,744,383 B1 | 6/2004 | Alfred et al. | |
| 6,744,740 B2 | 6/2004 | Chen | |
| 6,757,545 B2 | 6/2004 | Nowak et al. | |
| 6,801,782 B2 | 10/2004 | McCrady et al. | |
| 6,801,855 B1 | 10/2004 | Walters et al. | |
| 6,816,782 B1 | 11/2004 | Walters et al. | |
| 6,892,054 B2 | 5/2005 | Belcher et al. | |
| 6,933,100 B2 | 8/2005 | Igawa et al. | |
| 6,933,860 B1 | 8/2005 | Gehman et al. | |
| 7,065,349 B2 | 6/2006 | Nath et al. | |
| 7,098,805 B2 | 8/2006 | Meadows et al. | |
| 7,113,793 B2 | 9/2006 | Veerasamy et al. | |
| 7,149,534 B2 | 12/2006 | Bloebaum et al. | |
| 7,181,218 B2 | 2/2007 | Ovesjo et al. | |
| 7,277,049 B2 | 10/2007 | Korneluk et al. | |
| 7,289,039 B2 | 10/2007 | Kato et al. | |
| 7,346,359 B2 | 3/2008 | Damarla et al. | |
| 7,359,719 B1 | 4/2008 | Duffett-Smith et al. | |
| 7,366,492 B1 | 4/2008 | Ganesh | |
| 7,375,649 B2 | 5/2008 | Gueziec | |
| 7,432,829 B2 | 10/2008 | Poltorak | |
| 7,436,794 B2 | 10/2008 | Takahashi et al. | |
| 7,508,321 B2 | 3/2009 | Gueziec | |
| 7,664,492 B1 | 2/2010 | Lee et al. | |
| 7,696,922 B2 | 4/2010 | Nicholson et al. | |
| 7,697,917 B2 | 4/2010 | Camp et al. | |
| 7,706,964 B2 | 4/2010 | Horvitz et al. | |
| 7,744,740 B2 | 6/2010 | Diehl | |
| 7,747,258 B2 | 6/2010 | Farmer et al. | |
| 7,761,225 B2 | 7/2010 | Vaughn | |
| 7,831,380 B2 | 11/2010 | Chapman et al. | |
| 7,848,880 B2 | 12/2010 | Cheung | |
| 7,890,299 B2 | 2/2011 | Fok et al. | |
| 7,917,156 B2 | 3/2011 | Sheynblat | |
| 7,945,271 B1 | 5/2011 | Barnes et al. | |
| 7,958,001 B2 | 6/2011 | Abbadessa et al. | |
| 7,962,162 B2 | 6/2011 | McNair | |
| 7,962,280 B2 | 6/2011 | Kindo et al. | |
| 7,994,981 B1 | 8/2011 | Farrokhi et al. | |
| 7,996,020 B1 | 8/2011 | Chhabra | |
| 8,000,726 B2 | 8/2011 | Altman et al. | |
| 8,005,050 B2 | 8/2011 | Scheinert et al. | |
| 8,010,164 B1 | 8/2011 | Sennett et al. | |
| 8,036,822 B2 | 10/2011 | Ho et al. | |
| 8,054,802 B2 | 11/2011 | Burgess et al. | |
| 8,121,604 B1 | 2/2012 | Schwinghammer | |
| 8,140,079 B2 | 3/2012 | Olson | |
| 8,193,984 B2 | 6/2012 | Ward et al. | |
| 8,194,589 B2 | 6/2012 | Wynn et al. | |
| 8,195,175 B2 | 6/2012 | Govindan et al. | |
| 8,224,349 B2 | 7/2012 | Meredith et al. | |
| 8,253,559 B2 | 8/2012 | Howard et al. | |
| 8,254,959 B2 | 8/2012 | Fix et al. | |
| 8,264,956 B2 | 9/2012 | Ramankutty et al. | |
| 8,270,933 B2 | 9/2012 | Riemer et al. | |
| 8,280,438 B2 | 10/2012 | Barbera et al. | |
| 8,295,854 B2 | 10/2012 | Osann et al. | |
| 8,307,030 B1 | 11/2012 | Hu | |
| 8,355,364 B1 | 1/2013 | Vargantwar et al. | |
| 8,355,865 B2 | 1/2013 | Wagner et al. | |
| 8,417,264 B1 | 4/2013 | Whitney et al. | |
| 8,548,494 B2 | 10/2013 | Agarwal et al. | |
| 8,594,700 B2 | 11/2013 | Nabbefeld | |
| 8,666,388 B2 | 3/2014 | Catovic et al. | |
| 8,666,390 B2 | 3/2014 | Meredith et al. | |
| 2001/0047242 A1 | 11/2001 | Ohta | |
| 2002/0059266 A1 | 5/2002 | I'anson et al. | |
| 2002/0069312 A1 | 6/2002 | Jones | |
| 2002/0077116 A1 | 6/2002 | Havinis et al. | |
| 2002/0172223 A1 | 11/2002 | Stilp et al. | |
| 2003/0092448 A1 | 5/2003 | Forstrom et al. | |
| 2003/0097330 A1 | 5/2003 | Hillmer et al. | |
| 2003/0115260 A1 | 6/2003 | Edge | |
| 2003/0158924 A1 | 8/2003 | DeLegge | |
| 2003/0222819 A1 | 12/2003 | Karr et al. | |
| 2003/0225508 A9 | 12/2003 | Petzld et al. | |
| 2004/0067759 A1 | 4/2004 | Spirito et al. | |
| 2004/0082338 A1 | 4/2004 | Norrgard et al. | |
| 2004/0127191 A1 | 7/2004 | Matsunaga | |
| 2004/0131036 A1 | 7/2004 | Walsh | |
| 2004/0155814 A1 | 8/2004 | Bascobert | |
| 2004/0172190 A1 | 9/2004 | Tsunehara et al. | |
| 2004/0219930 A1 | 11/2004 | Lin | |
| 2004/0224698 A1 | 11/2004 | Yi et al. | |
| 2005/0007993 A1 | 1/2005 | Chambers et al. | |
| 2005/0039056 A1 | 2/2005 | Bagga et al. | |
| 2005/0053099 A1 | 3/2005 | Spear et al. | |
| 2005/0136911 A1 | 6/2005 | Csapo et al. | |
| 2005/0239410 A1 | 10/2005 | Rochester | |
| 2005/0272445 A1 | 12/2005 | Zellner et al. | |
| 2005/0276385 A1 | 12/2005 | McCormick et al. | |
| 2006/0030333 A1 | 2/2006 | Ward et al. | |
| 2006/0046744 A1 | 3/2006 | Dublish et al. | |
| 2006/0075131 A1 | 4/2006 | Douglas et al. | |
| 2006/0089153 A1 | 4/2006 | Sheynblat | |
| 2006/0240839 A1 | 10/2006 | Chen et al. | |
| 2006/0267841 A1 | 11/2006 | Lee et al. | |
| 2006/0270419 A1 | 11/2006 | Crowley et al. | |
| 2006/0282660 A1 | 12/2006 | Varghese et al. | |
| 2007/0001873 A1 | 1/2007 | Ishikawa et al. | |
| 2007/0060130 A1 | 3/2007 | Gogic et al. | |
| 2007/0176749 A1 | 8/2007 | Boyd | |
| 2007/0213074 A1 | 9/2007 | Fitch et al. | |
| 2007/0217375 A1 | 9/2007 | Zampiello et al. | |
| 2007/0217379 A1 | 9/2007 | Fujiwara et al. | |
| 2007/0293157 A1 | 12/2007 | Haartsen et al. | |
| 2007/0298807 A1 | 12/2007 | Yarkosky | |
| 2008/0004789 A1 | 1/2008 | Horvitz et al. | |
| 2008/0010365 A1 | 1/2008 | Schneider | |
| 2008/0039114 A1 | 2/2008 | Phatak et al. | |
| 2008/0070593 A1 | 3/2008 | Altman et al. | |
| 2008/0071466 A1 | 3/2008 | Downs et al. | |
| 2008/0076450 A1 | 3/2008 | Nanda et al. | |
| 2008/0096566 A1 | 4/2008 | Brunner et al. | |
| 2008/0133730 A1 | 6/2008 | Park et al. | |
| 2008/0186234 A1 | 8/2008 | Alles et al. | |
| 2008/0192682 A1 | 8/2008 | Matsumoto et al. | |
| 2008/0274750 A1 | 11/2008 | Carlson et al. | |
| 2008/0299995 A1 | 12/2008 | Spain | |
| 2008/0305832 A1 | 12/2008 | Greenberg | |
| 2008/0311923 A1 | 12/2008 | Petrovic et al. | |
| 2009/0024546 A1 | 1/2009 | Ficcaglia et al. | |
| 2009/0052330 A1* | 2/2009 | Matsunaga et al. | 370/242 |
| 2009/0079622 A1 | 3/2009 | Seshadri et al. | |
| 2009/0104917 A1 | 4/2009 | Ben Rached et al. | |
| 2009/0117907 A1 | 5/2009 | Wigren et al. | |
| 2009/0131073 A1 | 5/2009 | Carlson et al. | |

(56) References Cited

U.S. PATENT DOCUMENTS

| | | | |
|---|---|---|---|
| 2009/0181695 A1 | 7/2009 | Wirola et al. | |
| 2009/0260055 A1 | 10/2009 | Parmar | |
| 2009/0280828 A1 | 11/2009 | Wang et al. | |
| 2009/0286510 A1 | 11/2009 | Huber et al. | |
| 2009/0287922 A1 | 11/2009 | Herwono et al. | |
| 2009/0310501 A1 | 12/2009 | Catovic et al. | |
| 2009/0327134 A1 | 12/2009 | Carlson et al. | |
| 2010/0020776 A1 | 1/2010 | Youssef et al. | |
| 2010/0054237 A1 | 3/2010 | Han et al. | |
| 2010/0058442 A1 | 3/2010 | Costa et al. | |
| 2010/0081389 A1 | 4/2010 | Lawrow | |
| 2010/0100732 A1 | 4/2010 | Hatakeyama et al. | |
| 2010/0113035 A1 | 5/2010 | Eskicioglu et al. | |
| 2010/0120447 A1 | 5/2010 | Anderson et al. | |
| 2010/0124931 A1 | 5/2010 | Eskicioglu et al. | |
| 2010/0135178 A1 | 6/2010 | Aggarwal et al. | |
| 2010/0144368 A1 | 6/2010 | Sullivan | |
| 2010/0159951 A1 | 6/2010 | Shkedi et al. | |
| 2010/0172259 A1 | 7/2010 | Aggarwal et al. | |
| 2010/0189236 A1 | 7/2010 | MacDonald et al. | |
| 2010/0190509 A1* | 7/2010 | Davis | 455/456.1 |
| 2010/0195566 A1 | 8/2010 | Krishnamurthy et al. | |
| 2010/0203903 A1 | 8/2010 | Dingler et al. | |
| 2010/0207470 A1 | 8/2010 | Kim et al. | |
| 2010/0220665 A1 | 9/2010 | Govindan et al. | |
| 2010/0222075 A1 | 9/2010 | Miura | |
| 2010/0227589 A1 | 9/2010 | Cook et al. | |
| 2010/0250542 A1 | 9/2010 | Fujimaki | |
| 2010/0299060 A1 | 11/2010 | Snavely et al. | |
| 2010/0311437 A1 | 12/2010 | Palanki et al. | |
| 2010/0313157 A1 | 12/2010 | Carlsson et al. | |
| 2011/0009068 A1 | 1/2011 | Miura | |
| 2011/0010085 A1 | 1/2011 | Tanaka et al. | |
| 2011/0023129 A1 | 1/2011 | Vernal | |
| 2011/0053609 A1 | 3/2011 | Grogan et al. | |
| 2011/0060808 A1 | 3/2011 | Martin et al. | |
| 2011/0065450 A1 | 3/2011 | Kazmi | |
| 2011/0072034 A1 | 3/2011 | Sly | |
| 2011/0076975 A1 | 3/2011 | Kim et al. | |
| 2011/0077032 A1 | 3/2011 | Correale et al. | |
| 2011/0161261 A1 | 6/2011 | Wu et al. | |
| 2011/0164596 A1 | 7/2011 | Montemurro et al. | |
| 2011/0171912 A1 | 7/2011 | Beck et al. | |
| 2011/0172905 A1 | 7/2011 | Schroder et al. | |
| 2011/0205964 A1 | 8/2011 | Fix et al. | |
| 2011/0207470 A1 | 8/2011 | Meredith et al. | |
| 2011/0210843 A1 | 9/2011 | Kummetz et al. | |
| 2011/0210849 A1 | 9/2011 | Howard et al. | |
| 2011/0244879 A1 | 10/2011 | Siomina et al. | |
| 2011/0256874 A1 | 10/2011 | Hayama et al. | |
| 2011/0271331 A1 | 11/2011 | Adams | |
| 2011/0296169 A1 | 12/2011 | Palmer | |
| 2011/0319098 A1 | 12/2011 | Potorny et al. | |
| 2012/0016902 A1 | 1/2012 | Ranjan et al. | |
| 2012/0025976 A1 | 2/2012 | Richey et al. | |
| 2012/0028650 A1 | 2/2012 | Cooper et al. | |
| 2012/0030083 A1 | 2/2012 | Newman et al. | |
| 2012/0052884 A1 | 3/2012 | Bogatin | |
| 2012/0062415 A1 | 3/2012 | Hwang et al. | |
| 2012/0087338 A1 | 4/2012 | Brandt et al. | |
| 2012/0139782 A1 | 6/2012 | Gutt et al. | |
| 2012/0158289 A1 | 6/2012 | Bernheim Brush et al. | |
| 2012/0182874 A1 | 7/2012 | Siomina et al. | |
| 2012/0287911 A1 | 11/2012 | Takano et al. | |
| 2012/0317500 A1 | 12/2012 | Kosseifi et al. | |
| 2012/0323703 A1 | 12/2012 | Hillier et al. | |
| 2013/0007058 A1 | 1/2013 | Meredith et al. | |
| 2013/0023237 A1 | 1/2013 | Meredith et al. | |
| 2013/0023274 A1 | 1/2013 | Meredith et al. | |
| 2013/0023281 A1 | 1/2013 | Meredith et al. | |
| 2013/0281111 A1 | 10/2013 | Syrjarinne et al. | |
| 2013/0324149 A1 | 12/2013 | Fix et al. | |
| 2014/0062782 A1 | 3/2014 | Abraham | |
| 2014/0171060 A1 | 6/2014 | Cook et al. | |

OTHER PUBLICATIONS

Fleischfresser. Never Stop at a Red-Light Again. Published online Aug. 30, 2011. http://www.smartplanet.com/blog/ . . . , 2 pages.

Cellphone Networks and the Future of Traffic. Published online Mar. 2, 2011. http://m.wired.com/autopia/2011/03/cell-phone-networks-and-the-future- . . . 15 pages.

Intelligent Transportation System. Published online http://en.wikipedia.org/wiki/Intelligent_transportation_system, 7 pages.

Koukoumidis Emmanouil, Peh Li-Shiuan, Martonosi Margaret, SignalGuru: Leveraging Mobile Phones for Collaborative Traffic Signal Schedule Advisory. 14 pages.

Bitcarrier Technology. Published online at http://www.bitcarrier.com/technology. 1 page.

Hao Peng, Ban Xuegang(Jeff). Estimating Vehicle Position in a Queue at Signalized Intersections Using Simple Travel Times from Mobile Sensors. 6 pages.

Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.

International Search Report for PCT Application No. US2011/026122 dated Sep. 10, 2011, 11 pages.

International Search Report for PCT Application No. US2011/026120 dated Sep. 9, 2011 13 pages.

Charitanetra et al. "Mobile positioning location using E-OTD method for GSM network" Research and.Development, 2003. Proceedings Student Conference on Putrajaya, Malaysia Aug. 25-26, 2003, pp. 319-324.

"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based-...1&ct=clnk, Oct. 12, 2010.

"Location Based Fraud Detection", Finsphere Corporation, 2008-2010.

Cortes, et al. "Support-Vector Networks", Machine Learning, 20, 1995. http://www.springerlink.com/content/k238jx04hm87j80g/fulltext.pdf. Last accessed Dec. 24, 2010, 25 pages.

ACM Website, Press release of Mar. 17, 2009. http://www.acm.org/press-room/news-releases/pdfs/awards-08-groupa1.pdf. Last accessed Dec. 24, 2010, 3 pages.

Boser, et al. A training algorithm for optimal margin classifiers. In D. Haussler, editor, 5th Annual ACM Workshop on COLT, pp. 144-152, Pittsburgh, PA, 1992. ACM Press. http://citeseerx.ist.psu.edu/viewdoc/summary?doi=10.1.1.21.3818. Last accessed Dec. 24, 2010, 9 pages.

Hsu, et al. A Practical Guide to Support Vector Classification. Department of Computer Science National Taiwan University, Last updated: Apr. 15, 2010. http://www.csie.ntu.edu.tw/~cjlin/papers/guide/guide.pdf. Last accessed Dec. 24, 2010, 16 pages.

Drucker, et al. Support Vector Regression Machines. http://scholar.google.com/scholar?q=%22Support+Vector+Regression+Machines.%22. Last accessed Dec. 24, 2010, 7 pages.

New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.

3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.

3rd Generation Partnership Project, Technical Specification, "Group Radio Access Network, UTRAN Iuh interface Node B Application Part (NBAP) signalling (Release 8)", 3GPP TS 25.469 V8.0.0 (Dec. 2008), last viewed Jul. 1, 2009, 56 pages.

Sullivan, Mark. "Signs and Wonders: Is AT&T Stepping Up Its Game?" PC World, Dec. 10, 2009, 1 page.

ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.

(56) References Cited

OTHER PUBLICATIONS

ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.
Suykens et al., "Least squares support vector machine classifiers", Neural Processing Letters, vol. 9, No. 3, Jun. 1999, pp. 293-300.
Ferris et al. (2002). "Interior-point methods for massive support vector machines". SIAM Journal on Optimization 13: 783-804. doi:10.1137/S1052623400374379.
Meyer et al. "The support vector machine under test." Neurocomputing 55(1-2): 169-186, 2003.
OA dated Oct. 15, 2012 for U.S. Appl. No. 13/523,778, 21 pages.
OA dated Dec. 20, 2012 for U.S. Appl. No. 12/958,146, 23 pages.
OA dated Dec. 28, 2012 for U.S. Appl. No. 13/188,295, 37 pages.
OA dated Jan. 3, 2013 for U.S. Appl. No. 13/188,300, 36 pages.
OA dated Nov. 8, 2012 for U.S. Appl. No. 13/204,535, 30 pages.
OA dated Oct. 2, 2012 for U.S. Appl. No. 13/554,285, 19 pages.
OA dated Aug. 30, 2012 for U.S. Appl. No. 12/958,146, 40 pages.
MobileLutions Introduces MobiLoc—A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
OA dated Jul. 30, 2012 for U.S. Appl. No. 12/967,747, 28 pages.
OA dated Jul. 17, 2012 for U.S. Appl. No. 13/220,083, 57 pages.
OA dated Sep. 11, 2012 for U.S. Appl. No. 13/188,345, 44 pages.
Final Office Action dated Jan. 25, 2013, for U.S. Appl. No. 13/554,285, 20 pages.
Non-Final Office Action dated Mar. 19, 2013, for U.S. Appl. No. 13/174,541, 46 pages.
Final Office Action dated Feb. 13, 2013, for U.S. Appl. No. 13/220,083, 48 pages.
Final Office Action dated Feb. 22, 2013, for U.S. Appl. No. 13/188,345, 45 pages.
Final Office Action dated Mar. 15, 2013, for U.S. Appl. No. 13/204,535, 18 pages.
Non-Final Office Action dated Mar. 19, 2013, for U.S. Appl. No. 13/284,497, 46 pages.
Non-Final Office Action dated Apr. 19, 2013, for U.S. Appl. No. 13/277,595, 58 pages.
OA dated Apr. 13, 2012 for U.S. Appl. No. 12/416,853, 36 pages.
Office Action dated Dec. 15, 2011 for U.S. Appl. No. 12/712,424, 34 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Non-Final Office Action dated Sep. 19, 2013, for U.S. Appl. No. 13/927,020, 30 pages.
Non-Final Office Action dated Oct. 2, 2013, for U.S. Appl. No. 12/958,146, 31 pages.
Non-Final Office Action dated Sep. 26, 2013, for U.S. Appl. No. 13/284,456, 58 pages.
RouteFinder 3.00 for ArGIS Documentation, © 2007 Routeware and Higher Mapping Solutions, 71 pages, downloaded from http://www.routeware.dk/download/routefinder_arcgis.pdf.
mySociety (Web page), "More travel-time maps and their uses", 2007, downloaded from http://www.mySociety.org/2007/more-travel-maps/, 10 pages total (including a single page Examiner's attachment showing the operation of the interactive travel-time map). Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Sep. 18, 2013, for U.S. Appl. No. 13/284,497, 30 pages.
Final Office Action dated Aug. 22, 2013, for U.S. Appl. No. 13/277,595, 36 pages.
Final Office Action dated Oct. 21, 2013, for U.S. Appl. No. 13/523,770, 24 pages.
Office Action dated Nov. 5, 2013 for U.S. Appl. No. 13/188,345, 30 pages.
Notice of Allowance mailed Aug. 12, 2013, for U.S. Appl. No. 13/174,541, 40 pages.
Final Office Action dated Aug. 2, 2013, for U.S. Appl. No. 13/188,295, 26 pages.
Final Office Action dated Aug. 2, 2013, for U.S. Appl. No. 13/188,300, 38 pages.
Non-Final Office Action dated Jul. 17, 2013, for U.S. Appl. No. 13/188,345, 27 pages.
Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.
Marko Silventoinen, et al., "Mobile Station Locating in GSM" Helsinki, Finland, Last accessed on Nov. 15, 2011, 7 pages.
Office Action dated Dec. 30, 2013 for U.S. Appl. No. 13/305,267, 10 pages.
Office Action dated May 21, 2013 for U.S. Appl. No. 13/305,276, 28 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00 (c)2010 IEEE. Retrieved on May 10, 2013, 6 pages.
Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.
Pettersen, et al., "Automatic antenna tilt control for capacity enhancement in UMTS FDD." Retrieved on Mar. 25, 2012, 5 pages.
Islam, et al., "Self-Optimization of Antenna Tilt and Pilot Power for Dedicated Channels." Retrieved on Mar. 25, 2012, 8 pages.
Bigham, et al., "Tilting and Beam-shaping for Traffic Load Balancing in WCDMA Network." Retrieved on Mar. 25, 2012, 4 pages.
3GPP TS 25.215 V6.4.0 Physical Layer Measurements.
3GPP TS 25.331 V6.9.0 (Mar. 2006) RRC protocol for the UE-UTRAN radio interface.
3GPP TS 25.413 V6.9.0 (Mar. 2006) UTRAN Iu interface RANAP signalling.
Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.
Smith, et al., "Airsage Overview", (http://mikeontraffic.typepad.com/files/raleigh-winter-2011-presentation-v11-final.pdf) Retrieved on Sep. 29, 2012, 39 pages.
Office Action dated Feb. 5, 2014 for U.S. Appl. No. 13/526,988, 56 pages.

(56) References Cited

OTHER PUBLICATIONS

Non-Final Office Action dated Dec. 11, 2013, for U.S. Appl. No. 13/188,295, 52 pages.
Non-Final Office Action dated Dec. 24, 2013, for U.S. Appl. No. 13/188,300, 44 pages.
Final Office Action dated Dec. 11, 2013, for U.S. Appl. No. 13/291,917, 34 pages.
Final Office Action dated Jan. 28, 2014, for U.S. Appl. No. 12/958,146, 24 pages.
Final Office Action dated Feb. 24, 2014, for U.S. Appl. No. 13/927,020, 18 pages.
Notice of Allowance dated Feb. 14, 2014 for U.S. Appl. No. 13/284,456, 30 pages.
Office Action dated Mar. 25, 2014 for U.S. Appl. No. 13/488,144, 60 Pages.
Final Office Action dated Apr. 3, 2014 for U.S. Appl. No. 13/188,295, 37 pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Office Action dated Apr. 8, 2014 for U.S. Appl. No. 13/175,199, 52 Pages.
Office Action dated Apr. 23, 2014 for U.S. Appl. No. 13/291,917, 29 Pages.
Office Action dated Apr. 22, 2014 for U.S. Appl. No. 13/447,069, 51 Pages.
Non-Final Office Action dated Jun. 6, 2014 for U.S. Appl. No. 13/447,072, 25 pages.
Non-Final Office Action dated May 30, 2014 for U.S. Appl. No. 13/277,595, 49 pages.
Non-Final Office Action dated Jun. 3, 2014 for U.S. Appl. No. 13/523,770, 53 pages.
Office Action dated Sep. 20, 2012 for U.S. Appl. No. 12/870,254, 29 pages.
Office Action dated May 14, 2014 for U.S. Appl. No. 13/660,689, 62pages.
Office Action dated May 9, 2014 for U.S. Appl. No. 13/188,136, 33 pages.
Squires, "Practical Physics", Cambridge University Press, p. 12, 1986, 3 pages.
Represent (2000). In Collins English dictionary. Retrieved from http://search.credoreference.com/content/entry/hcengdict/represent/0, 2 pages.
Represent. (2001). In Chambers 21st century dictionary. Retrieved from http://search.credoreference.com/content/entry/chambdict/represent/O.
Represent. (2011). In the american heritage dictionary of the english language. Retrieved from http://search.credoreference.com/content/entry/hmdictenglang/represent/0.
Non-Final Office Action dated May 20, 2014 for U.S. Appl. No. 13/551,369, 29 pages.
Office Action dated Jun. 18, 2014 for U.S. Appl. No. 13/305,276, 26 Pages.
Office Action dated Jun. 26, 2014 for U.S. Appl. No. 13/557,425, 24 Pages.
Office Action dated Jun. 30, 2014 for U.S. Appl. No. 13/305,267, 44 Pages.
Office Action dated Jul. 22, 2014 for U.S. Appl. No. 12/958,146, 38 Pages.
Notice of Allowance dated Jul. 22, 2014 for U.S. Appl. No. 13/525,065, 82 Pages.
Notice of Allowance dated Jul. 7, 2014 for U.S. Appl. No. 13/188,295, 51 pages.
Notice of Allowance dated Jul. 22, 2014 for U.S. Appl. No. 13/188,300, 49 Pages.
Office Action dated Aug. 8, 2014 for U.S. Appl. No. 13/284,497, 48 pages.
Office Action dated Aug. 11, 2014 for U.S. Appl. No. 14/279,176, 22 pages.
Notice of Allowance dated Aug. 21, 2014 for U.S. Appl. No. 13/447,069, 78 pages.
Office Action dated Aug. 28, 2014 for U.S. Appl. No. 13/526,988, 83 pages.
Office Action dated Sep. 22, 2014 for U.S. Appl. No. 13/175,199, 62 pages.
Office Action dated Oct. 17, 2014 for U.S. Appl. No. 13/204,535, 47 pages.
Office Action dated Oct. 20, 2014 for U.S. Appl. No. 13/494,959, 64 pages.
Office Action dated Oct. 22, 2014 for U.S. Appl. No. 13/557,425, 59 pages.

* cited by examiner

PRIORITIZING NETWORK FAILURE TICKETS USING MOBILE LOCATION DATA

REFERENCE TO RELATED APPLICATIONS

The subject application for patent is related to co-pending U.S. application Ser. No. 12/712,424 entitled "TIMED FINGERPRINT LOCATION IN WIRELESS NETWORKS" and filed Feb. 25, 2010, assigned to the assignee hereof and hereby expressly incorporated by reference herein.

TECHNICAL FIELD

The subject disclosure relates to wireless communications and, more particularly, to prioritizing repair of wireless network service outages based on estimated impact to wireless network subscriber terminals.

BACKGROUND

Mobile equipment networks provide real-time and continuous wireless communication services to subscribers, through a deployment of wireless base stations and related control and support infrastructure collectively termed a radio access network (RAN). The RAN is the physical interface between the mobile network and the user terminal (e.g., mobile phone), utilizing wireless channels for real-time communication between client device and base station. Typically, base stations are deployed in a geometric arrangement to facilitate wireless service at any point within a geographic coverage area.

The most common geometric arrangement for a RAN deployment is a set of hexagonal cells mapped over a geographic coverage area. Each cell has a radio tower constructed at the center thereof, with base station equipment attached thereto. Client devices within a given cell typically communicate with the base station equipment of that cell, assuming the client device is capable of and permitted to do so. This geometric arrangement inherently provides a baseline communication quality, at least to a first order approximation, in that client devices will generally communicate with the nearest base station exhibiting the strongest signal.

In some cases, client devices can communicate with multiple base stations, or communicate with base station equipment in a nearby or neighboring cell, instead of a cell in which the client device is located. Generally speaking this occurs due to the time-varying nature of wireless communications. In the former case for instance, some wireless systems enable the client device to maintain basic signaling with an active set of multiple base stations. The client device can then monitor these signals over time and switch, or handoff, among the active set of base stations opportunistically—acquiring the best signal at a given point in time. In the latter case, a client device might communicate with a nearby cell if the cell in which the client is located has poor wireless characteristics (e.g., high interference, low signal strength), is at maximum capacity or is experiencing a service outage, or in like conditions.

Correcting wireless communication service outages is one important maintenance function of a wireless service provider. Service outages can occur due a wide range of circumstances, ranging from hardware failures (e.g., base station equipment) to heavy interference, and including temporary cell overloading and other transitory conditions. Generally, mobile networks include systems for detecting and reporting service outages to facilitate correcting these problems.

One particular example of network maintenance functionality is an electronic failure ticketing mechanism. For land mobile radio networks, when network nodes fail, an electronic ticket can be generated to notify service personnel of the failure. Specific examples of such failures can include transport failure (e.g., T1 failure), radio failure, microwave system failure, and so on. At a given point in time large networks can typically have multiple failures, affecting different radio base stations. Generally, all failures are granted equal priority and electronic tickets are serviced on a first-come-first-serve basis. This mitigates likelihood that a given failure is overlooked by service personnel. However, this mechanism does not discern a degree of impact on subscriber activity due to radio base site failures, either collectively or for given base stations. Where the volume of electronic failure tickets exceeds service resources, a common tendency is to increase the out of service time that triggers creation of a ticket. This of course doesn't cure the underlying failure, but merely masks magnitude of a given network problem. Accordingly, mechanisms for determining overall impact on network services and impact to subscriber activity can help to provide a better deployment of finite maintenance resources for correcting network service outages.

SUMMARY

The following presents a simplified summary of the disclosed subject matter in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

One or more aspects of the subject disclosure provide for prioritizing network repair tickets as a function of impact on network services. According to particular aspects, the subject disclosure provides for determining impact of a given service outage on surrounding network infrastructure. The impact can be characterized by estimating how mobile devices affected by the service outage are served, if at all, by surrounding network equipment. According to particular aspects, this estimation can be performed by accessing mobile device position data for an impacted area and identifying overlapping coverage areas, and signal characteristics of the surrounding network infrastructure. An estimate of changes in mobile population density for the surrounding network infrastructure can be analyzed to determine changes in network performance metrics (e.g., base station loading, quality of service, service coverage), and changes to subscriber service (e.g., data throughput, loss of service, etc.).

According to additional aspects, a repair priority can be established for a network repair ticket, reflecting an impact to network capacity or subscriber services resulting from a service outage. In this manner, tickets can be serviced according to the repair priority. This enables network maintenance personnel to correct problems having a greater impact on network subscribers first, followed by those having lesser impact on network subscribers.

In other disclosed aspects, network cells and sectors can be analyzed for repair priority based on a theoretical or anticipated service outage. In this manner, all or a subset of network sectors can be given a repair priority in advance of an actual service outage. This pre-prioritization of network repair tickets can minimize processing resources and time required to electronically generate a prioritized repair ticket at the time a service outage occurs.

Further to the above, pre-prioritization of network repair tickets can reflect dynamic, real-time conditions when a rich source of historical terminal population data is available. To this end, one or more further aspects of the subject disclosure incorporate real-time location monitoring of mobile terminals within a network. Real-time location data can be stored in a database and updated over time. Further, the data can be analyzed to identify statistically significant changes in terminal density patterns at various times or time intervals. Where significant changes are identified, repair ticket priorities can be updated or modified to reflect a terminal density that is relevant to a time in which an outage occurs. Thus, particular network sectors or cells can be associated with a set of repair ticket priorities that vary as a function of time of day, day of the week, season of the year, and so on, according to at least one aspect disclosed herein.

In still other aspects, terminal density patterns are generated with high resolution location monitoring capabilities, to increase accuracy of network impact estimates resulting from a service outage. In a specific aspect, terminal locations are determined utilizing a timed fingerprint location (TFL) grid, mapped to a geographic region covered by a network. By leveraging information obtained from location-aware terminals, accurate signal timing and delay information can be acquired for a sector, which can be leveraged to improve resolution of the TFL grid. In some aspects, the TFL grid can have minimum geographic feature size of 500 meters or less. In at least one aspect, the TFL grid can have minimum geographic feature size of 100 meters or less.

Once accurate signal information is acquired in a sector, location information for a mixed population of location-aware and non location-aware terminals can be generated. Terminal location information for network sectors can be re-acquired over time (e.g., periodically, upon occurrence of an event, or the like, or a suitable combination thereof) and stored in the database described above. Because the terminal density data set can be a rich store of information describing real time and historical terminal positions within a network, much greater accuracy in estimating network impact in response to service outages can be achieved as compared with conventional mechanisms.

In at least one other aspect of the subject disclosure, repair ticket priorities can be generated real-time in response to an outage, or can be predetermined. In the former case, real-time terminal density information can be utilized, optionally in conjunction with historic terminal population density information, to estimate network impact in response to a service outage. In the latter case, a database can maintain the predetermined ticket priorities based solely on historic terminal population density information. Further, the predetermined ticket priorities can be updated in response to changes in historic terminal population density information. A review of such information can be triggered periodically to identify suitable changes, or the information can be monitored to identify suitable changes, the updates being generated automatically in response thereto.

DETAILED DESCRIPTION

Figure 1:
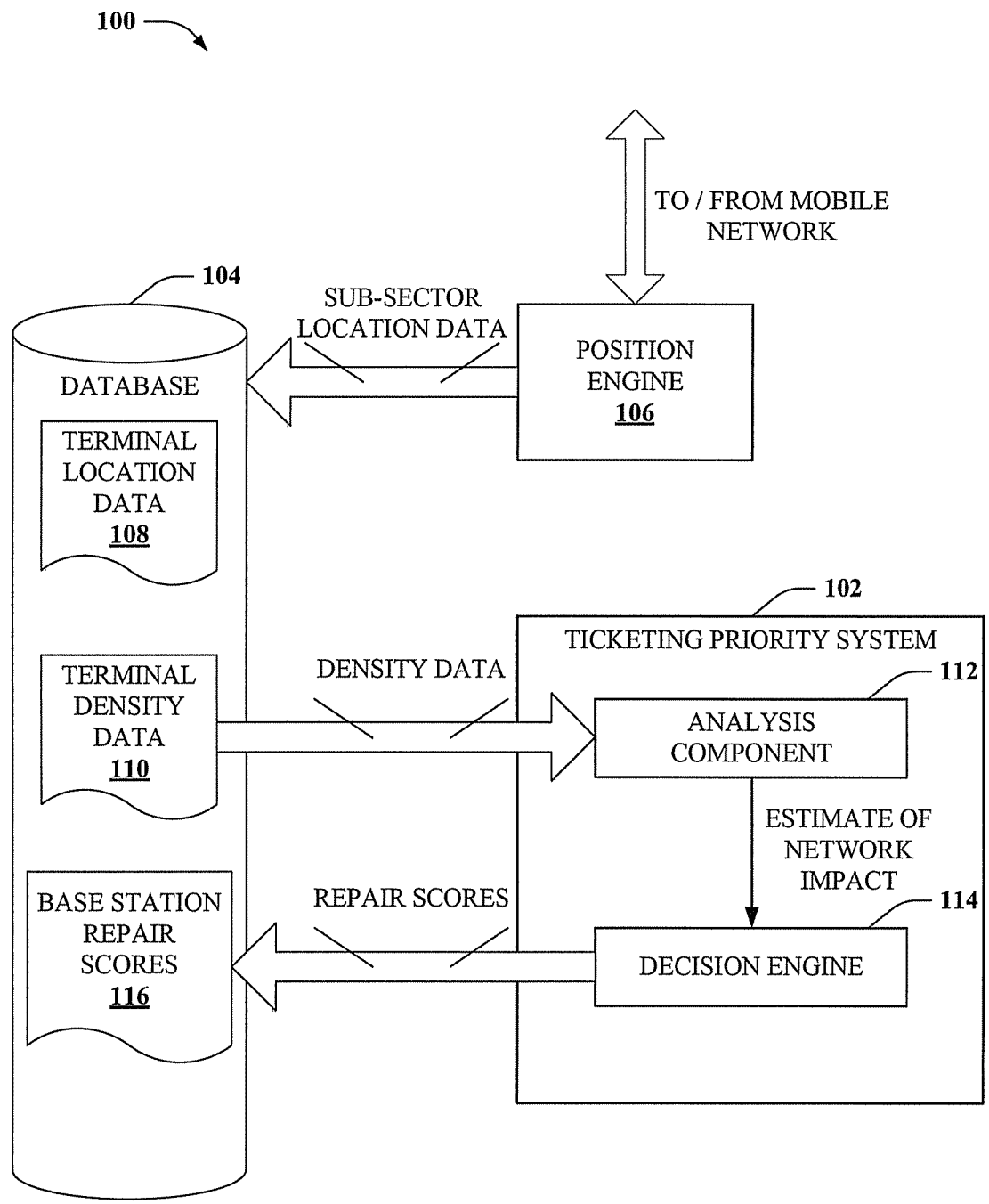
FIG. 1 illustrates a block diagram of an example system for prioritizing network repair tickets according to various aspects of the subject disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter can be practiced without these specific details. In other instances, well-known structures and devices are shown in block diagram form to facilitate describing the disclosed subject matter.

Where used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. Also, these components can execute from various computer readable media having various data structures stored thereon. The components may communicate via local or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

Referring now to the figures, FIG. 1 illustrates a block diagram of an example system 100 that provides prioritization for network repair tickets, according to particular aspects of the subject disclosure. The prioritization can be based at least in part on impact to subscriber services that results from a communication error affecting one or more base stations. When a base station communication failure occurs, the base station(s) can be given a repair ticket identifying the priority of repair for this base station(s). Because the priority is based on impact to subscriber services, limited repair resources can be allocated to correct problems having greater subscriber impact first, in the event that a number of existing problems exceeds capacity of repair resources. According to particular aspects of the subject disclosure, system 100 can estimate subscriber impact from a rich set of objective network data and conditions known to affect subscriber experience. Thus, system 100 can achieve a much more accurate characterization of subscriber impact than conventional systems, which have limited or no capability of doing so.

For land radio networks, error identification systems typically treat all communication failures with equal priority. A common performance metric for maintenance personnel responding to a base station repair ticket is average ticket age, where high performance is achieved merely by decreasing average age of outstanding repair tickets. In other words, base station repair tickets are treated on a first-in-first-out basis. Unfortunately, this performance metric incorporates no incentive to distinguish network errors having greater customer impact from those having lesser customer impact, and treating the former with higher priority.

Generally throughout mobile network deployments, a mobile terminal within a given geographic area can be in wireless range of multiple base stations. This condition is referred to herein as coverage overlap (e.g., see FIG. 5, infra). Thus, if one or a small cluster of base stations near this geographic area experiences a communication problem, the mobile terminal may not observe a noticeable loss of wireless services. Particularly, service can be provided instead by one or more other base stations near the geographic area. These other base stations "fill in" for the base station(s) experiencing the communication problem and little or no subscriber impact results there from. In another example, a sector currently serving no mobile terminals might also have limited subscriber impact in the event of a communication problem. In contrast, a region having limited or no coverage overlap, or having high terminal density at or near base station processing capacity, or at or near wireless resource capacity, or some combination thereof can result in significant subscriber impact in the event of a communication problem (e.g., high call drop rates, low throughput, poor quality of service, and so on).

Where few or no subscribers observe a noticeable loss of service as a result of a network error, it can be desirable to treat this network error with lower priority. Likewise, where significant subscriber impact occurs, it can be desirable to give an error much greater priority. In this manner, limited maintenance resources can be deployed to best serve subscriber needs. This is in sharp contrast with conventional mechanisms, which have limited to no capability of distinguishing subscriber impact, let alone giving greater priority to network errors that impact subscriber or network services most.

System 100 includes a ticketing priority system 102 communicatively connected with a database 104. Ticketing priority system 102 can be configured to estimate or measure, or a combination thereof, impact of network communication errors on subscriber services or network performance. Additionally, ticketing priority system 102 can be configured to generate priorities for repairing the network communication errors, which can be stored in database 104. These priorities can then be used for base station repair tickets, enabling repair personnel to give higher priority to errors having greater impact on network performance and subscriber experience.

According to particular aspects of the subject disclosure, system 100 can comprise a position engine 106. Position engine 106 can be configured to calculate location data for a dynamic population of mobile terminals served by a mobile network. This location data is stored in database 104, in a terminal location data storage 108. Additionally, database 104 can be configured to analyze terminal location data as a function of geographic area served by a mobile network, as well as subsets of the geographic area (e.g., cells or sectors, groups of cells/sectors, and so on). From this analysis, database 104 can derive density information for a dynamic population of mobile terminals associated with the mobile network. This density information is referred to herein as terminal population density information, or just terminal density information.

Terminal density information generated by database 104 from terminal location data storage 108 is stored in a terminal density storage 110. The terminal density information can reflect, for instance, historic distribution of mobile terminals throughout the mobile network, or subsets of the mobile network. The terminal density information can be utilized to estimate impact of localized service outages on network performance and subscriber services. This provides a mechanism to distinguish some service outages from others on the basis of these criteria. Generally, the more rich and comprehensive the data set of terminal density information, the more accurate these estimates.

Ticketing priority system 102 can comprise an analysis component 112 configured to generate an estimate of network impact for base stations of the mobile network. The estimate can be generated in response to a service error related to a particular base station of the mobile network, or can be generated in advance of the service error, or a suitable combination thereof (e.g., historic information can be leveraged to generate a baseline estimate that is refined by real-time data in response to a service outage). Analysis component 112 can derive network impact at least in part from terminal density information 110, and terminal location data 108. Such a derivation can be accomplished because knowledge of terminal location within a sector can generally be utilized to predict what nearby base stations will serve respective terminals in the event of a service failure at that sector. This prediction can be made by examining several objective conditions within a sector. One example includes analyzing coverage overlap patterns (e.g., see FIG. 5) for the sector and identifying terminals that are in a portion of the sector that overlaps coverage with one of the nearby base stations. In addition, analysis component 112 can reference measured or reported base station signal characteristics to predict which base station signal will be strongest at a particular mobile terminal. Based on mobile terminal location, coverage overlap and surrounding base station signal characteristics, analysis component 112 can predict changes in base station loading and related changes in network and subscriber performance metrics associated therewith.

As utilized herein, the term "network impact" can include aggregate performance metrics for groups of terminals within a sector(s), or performance metrics for individual terminals therein. Aggregate performance metrics can include average quality of service, call connectivity rate, call drop rate, base station loading, percent of resource capacity, or the like. Individual performance metrics can include data throughput, quality of service, and other metrics observable for a single device. In addition, it should be appreciated that analysis component 112 can be configured to calculate network impact metrics utilizing different functions of aggregate and individual performance metrics. This can provide flexibility for different mobile service providers, enabling repair ticket priorities to reflect varying customer service goals of those providers. Thus, one service provider might establish a network impact metric weighted more heavily toward aggregate performance metrics, whereas another might weight more heavily toward individual performance metrics, while yet another could weight evenly between the two, and so on.

In addition to the foregoing, ticketing priority system 102 can comprise a decision engine 114 configured to quantify a repair priority for respective base stations of a mobile network, based at least in part on an estimate of network impact generated by analysis component 112 for respective base stations. Repair scores can be generated for these base stations and stored in database 104, in a base station repair score file 116. Various algorithms for generating the repair score are considered within the scope of the subject application. For instance, decision engine 114 can employ an algorithm that separately scores and then aggregates a set of performance metrics (aggregate or individual) that comprise the overall estimate of network impact.

As one specific example, the set of performance metrics can include percentage of service coverage in an affected sector, effect on voice quality, effect on data throughput, and changes in loading for nearby sectors, (or like network characteristics or other suitable combinations thereof). The algorithm can separately score each performance metric, and add up the separate scores to derive the quantified repair priority for a particular base station. Thus, where a service outage in a sector is predicted to have a greater detrimental impact on service coverage, voice quality, data throughput, or loading of nearby sectors, (or combinations thereof), the sector will have a higher repair priority. It should be appreciated that other performance metrics can be employed in estimating network impact in addition to or in place of one or more metrics identified above. Such performance metrics could include capacity, number, density and resources of nearby base stations, type and quantity of calls being impacted (e.g., how many voice calls, how many data calls, how many audio/video calls, etc.) and respective importance of respective types of calls, and so on. The foregoing is not intended to provide an exhaustive list of suitable performance metrics for generating estimates of network impact or repair priorities based thereon. Rather, other suitable performance metrics known in the art or made known to one of skill in the art by way of the context provided herein are considered within the scope of the subject disclosure.

As mentioned above, accuracy of network impact estimates will generally improve with richer and more comprehensive terminal density data 110. This can be achieved in multiple ways. First, the more accurate the terminal location data 108, and the higher the resolution of such data (e.g., the smaller the error in terminal position), the better the terminal density data 110. Second, the more frequently terminal location data 108 is captured and stored by position engine 106, the more closely location data and terminal density data 110 can reflect real contemporaneous mobile terminal locations and population densities, respectively. Thus, in particular aspects, position engine 102 can capture and store terminal location data 108 periodically, in response to a network event (e.g., service outage, change in capacity, etc.), when triggered (e.g., by a maintenance engine, or network service personnel, or the like), and so forth, to increase frequency for which location and density data is generated.

According to one or more further aspects, ticketing priority system 102 can re-evaluate network sectors to determine whether base station repair scores 116 should be modified. Changes might be appropriate where terminal density data 108 varies over time, for instance. This might occur in response to changes in subscriber population for a given area, changes in mobile network capacity (e.g., ability to support more subscribers), changes in city infrastructure (e.g., building of a sports stadium or arena that attracts a high density of subscribers for planned events), or various other circumstances. Generally, changes in terminal location can be captured by position engine 106 and stored at terminal location storage 108, and these changes can be reflected within terminal density data 110 upon re-evaluation and updating of terminal density data storage 110 by database 104. When such a change occurs, then, ticketing priority system 102 can receive updated terminal density data, re-estimate sector failure(s) on network impact, and update base station repair scores 116 accordingly.

As mentioned above, accuracy of terminal location data 108 can impact accuracy of terminal population density information and the base station repair scores based thereon. In at least one aspect of the subject disclosure, position engine 106 can be configured to acquire relatively accurate location information for mobile terminals. Some mobile terminals operating within a mobile network can be equipped with global positioning system (GPS) units, assisted GPS, satellite positioning systems such as global navigational satellite system (GLONASS) or the like. These mobile terminals having capability to determine their own location within a suitable accuracy (a threshold of which can be set by a service provider, e.g., within 100 meters or less, 50 meters or less, 20 meters or less, etc.) are referred to herein as location-aware terminals. In some aspects of the subject disclosure, position engine 106 can query location-aware mobile terminals to report their location, or position engine 106 can simply acquire location information submitted by these terminals according to mobile communication standards. As described in more detail below, this reporting can be leveraged to then determine accurate timing and delay information for wireless signals within a given sector, which in turn can be utilized to locate non location-aware terminals (terminals without GPS, AGPS, GLONASS, or other location systems), or location-aware terminals that are configured to not report their respective locations. Thus, position engine 106 can be configured to determine terminal location data for a mixed population of location-aware and non location-aware terminals, in at least one aspect of the subject disclosure.

Timing of wireless signals generally takes into consideration the time from wave signal generation, or output at a radio transmitter (e.g., a mobile terminal or base station), to detection at a receiver (e.g., a base station, a mobile terminal). Such timing includes site timing through link(s) to antenna(s), and propagation time over the air interface or wireless channel. Timing delay typically is caused by various sources, including equipment hardware factors, as well as environmental conditions within a given sector. From the hardware perspective, sources of delay can include, e.g., mismatches among electronic elements and components (e.g., impedance mismatch), stray capacitance and inductance, length of the antenna(s) cable(s) in a base station(s); tower height of base station, and so on. Timing delay spread generally originates from any signal path scattering, or "signal bounces," such as multipath, strong reflections, etc.; and the like. In an aspect of the disclosed subject matter, timing and delay errors can be compensated for where the errors in delay and timing can be quantified. Wherein better location measurements beget better timing measurements, aspects of the disclosed subject matter can, at least in part, contribute to improved network performance. Similarly, better timing measurements can be employed for better location determination. Further, it is noted that compensation of timing delay can depend on sector coverage, e.g., a first sector can be densely populated while a neighboring sector can include substantial areas of lower population density.

A time difference, 'C', observed at a mobile terminal includes both a cell site timing portion, 'A', and a RF propagation portion, 'B', such that A+B=C. Further, where cell site location and terminal location are known, the RF propagation time, B, can be deduced, e.g., B=(distance between terminal and cell site, divided by the speed of light). Thus, using the deduced RF propagation time, B, and observed terminal time difference, C, the cell site timing, A, can be calculated, as A=C−B. Site timing, A, is relatively stable over periods of hours to days for most modern network equipment. Therefore, once A is determined, C can be measured for additional terminals and the RF propagation time (i.e., B) for these additional terminals can be determined from B=C−A. RF propagation time, B, can then be converted into a distance (e.g., B*speed of light=distance) and, using multilateration techniques, respective positions of terminals can be identified.

Determining the values of B by geometry can be facilitated by knowledge of the location of a given base station and a given terminal. Generally, locations for planned deployments of base stations are typically known with high levels of precision, as these are normally permanent installations. Further, the location of a location-aware terminal can be acquired with relatively high accuracy from the terminal itself (e.g., AGPS being generally accurate to within 5-10 meters). Thus a location-aware terminal can facilitate the determination of A, as disclosed herein, such that a distance from a non-location aware terminal to the given base station can be derived from B=C−A, and converting B to this distance. Using multilateration techniques, a position of the non-location aware terminal in a macro cell can then be calculated with far greater accuracy than in conventional multilateration approaches. In experiments, these measurements can produce location accuracies for non-location aware terminals with median errors of <70 m in suburban areas. Multilateration incorporates compounding errors, however. Further, multilateration is also computationally significant (e.g., involves hyperbolic functions between NodeB site pairs (NBSPs) at (N−1)!, where N is the number of cell sites; for example, 5 cell sites would involve 24 simultaneous hyperbolic functions.) Timed fingerprint locating (TFL), for instance as disclosed in co-pending U.S. patent application Ser. No. 12/712,424—incorporated by reference herein in its entirety—can reduce computational complexity and provide pre-computed values in lookup tables to facilitate improved location techniques.

TFL information can include location or timing information as disclosed in more detail in incorporated U.S. patent application Ser. No. 12/712,424 filed Feb. 25, 2010. The location or timing information can be utilized to generate TFL location information for a UE. The TFL information can be information from systems in a timed fingerprint location wireless environment, such as a TFL component of a wireless telecommunications carrier. As a non-limiting example, a mobile device, including mobile devices not equipped with a GPS-type system (e.g., a non-location aware mobile device), can be located by looking up timing information associated with the mobile device from a TFL information reference.

In an aspect, TFL information can include information to determine a differential value for a NBSP and a bin grid frame, as disclosed in more detail in incorporated U.S. patent application Ser. No. 12/712,424. A centroid region (possible locations between any site pair) for an observed time value associated with any NBSP can be calculated and is related to the determined value (in units of chip) from any pair of NodeBs. When UE time data is accessed, a value look-up can be initiated (e.g., a lookup for "DV(?,X)" as disclosed in more detail in the above patent application incorporated herein by reference). Relevant NBSPs can be prioritized as part of the look-up. Further, the relevant pairs can be employed as an index to lookup a first primary set. As an example, time data for a UE can be accessed in relation to a locating event in a TFL wireless carrier environment. In this example, it can be determined that a NBSP, with a first reference frame, be used for primary set lookup with the computed DV(?,X) value as the index. This can for example return a set of bin grid frame locations forming a hyperbola between the NodeBs of the NBSP. A second lookup can then be performed for an additional relevant NBSP, with a second reference frame, using the same value DV(?,X), as an index into the data set. Continuing the example, the returned set for the look up with second NBSP can return a second set of bin grid frames. Thus, the UE is likely located in both sets of bin grid frames. Therefore, where the UE is likely in both sets, it is probable that the location for the UE is at an intersection of the two sets. Additional NBSPs can be included to further narrow the possible locations of the UE by providing additional intersections among relevant bin grid sets. Alternatively, or in addition, NodeB site groups comprising three, four, etc., NodeBs and associated sets of bin grid frames can be utilized to locate the UE at an intersection of two or more sets of bin grid frames to further refine location of the UE (e.g., by identifying an intersection of bin grid frames comprising fewer bin grids, or comprising bin grids having greater geographic resolution—such as 50 meter bin grids instead of 150 meter bin grids, etc.). As such, employing TFL information for location determination is demonstrably different from conventional location determination techniques or systems such as GPS, eGPS, triangulation or multilateration in wireless carrier environments, near field techniques, or proximity sensors.

Utilizing techniques described herein for determining terminal location, position engine 106 can obtain location information for a mixed population of location aware and non-location aware terminals. According to TFL grid techniques, terminals operating on a mobile network can be located within discrete areas or grids mapped to respective portions of a geographic area served by a base station. This technique can be replicated for other base stations within a mobile network, to acquire location information for terminals operating throughout the network. In some aspects, a non-location aware terminal can be located within a grid representing a geographic region that is about 500 square meters or less. In other aspects, the non-location aware terminal can be located within a grid representing that is about 100 square meters or less. In still other aspects, the non-location aware terminal can be located within a grid that is about 70 square meters or less.

In addition to the foregoing, terminal density data can be updated over time to reflect changes in terminal location data. Updates to terminal density data can be calculated periodically, in some instances, or in response to particular events (e.g., a service outage, a change in topology, a change in subscriber usage patterns, etc.). In at least one aspect, updates to terminal density data can be triggered by network personnel through a suitable interface. These changes can be stored in terminal density data storage 110 for use by ticketing priority system 102 as described herein.

Figure 2:
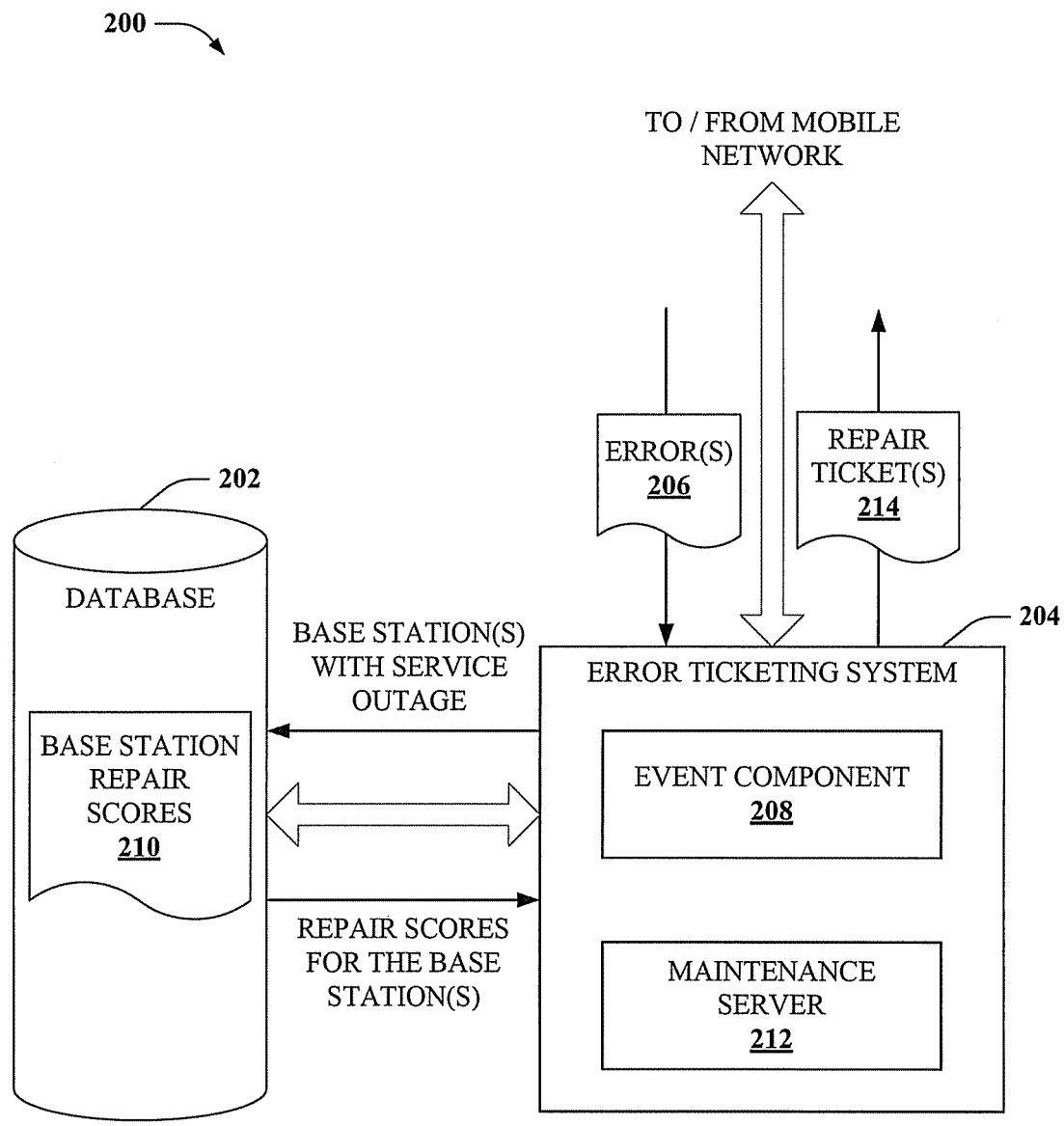
FIG. 2 depicts a block diagram of a sample system that generates prioritized network repair tickets in response to identified service outages.

FIG. 2 illustrates a block diagram of an example system 200 that provides base station repair ticket priorities in response to base station service outages according to additional aspects of the subject disclosure. System 200 can comprise a database 202 for storing base station priority scores 210, for a set of base stations of a mobile network. Additionally, system 200 can comprise an error ticketing system 204 configured to receive notices of service outage for a mobile network, and output a repair ticket for a base station associated with the service outage. The repair ticket can include indicia identifying the base station, as well as a priority for repairing the base station that is related to an impact on network services or subscriber experience caused by the service outage. The repair ticket can therefore be utilized by network repair personnel in prioritizing repair efforts consistent with customer service goals of a network operator. For instance, if three base station repair tickets are generated by error ticketing system 204, one having a base station repair priority of 90, and two having a base station repair priority of 30, service personnel can allocate resources first to the base station with the higher priority score, and then to the two base stations having lower priority score.

Error ticketing system 204 can be communicatively connected with a mobile network. Further, error ticketing system 204 can comprise and event component 208 configured to receive an electronic notification of error(s) 206 from the mobile network identifying a service outage in one or more sectors thereof. Event component 208 can identify a particular sector(s) affected by the service outage from the notification of error 206, and reference database 202 to obtain a base station repair score(s) associated with the sector(s).

Base station repair scores 210 can be generated at least in part from terminal population density information pertaining to the network, and can reflect likely impact to network sectors near to the service outage. This impact can be quantified in terms of performance metrics including base station loading and capacity, percent of coverage for affected subscriber terminals, quality of service for those subscriber terminals, data throughput, or like metrics or suitable combinations thereof, as described herein. Moreover, the terminal population density information and base station repair scores 210 can be updated over time to reflect changes in terminal population density for the mobile network.

Upon receiving a set of sectors from error ticketing system 204, database 202 can retrieve respective predetermined repair scores for each identified sector. These respective repair scores are provided to a maintenance server 212, which generates one or more repair tickets 214. Respective electronic repair tickets 214 can identify one or more affected sectors, and can also include respective repair scores for the one or more sectors. Electronic repair tickets 214 are transmitted to the mobile network in response to the notification of error 206, or, e.g., to a server utilized by repair personnel for receiving repair tickets, or the like.

Figure 3:
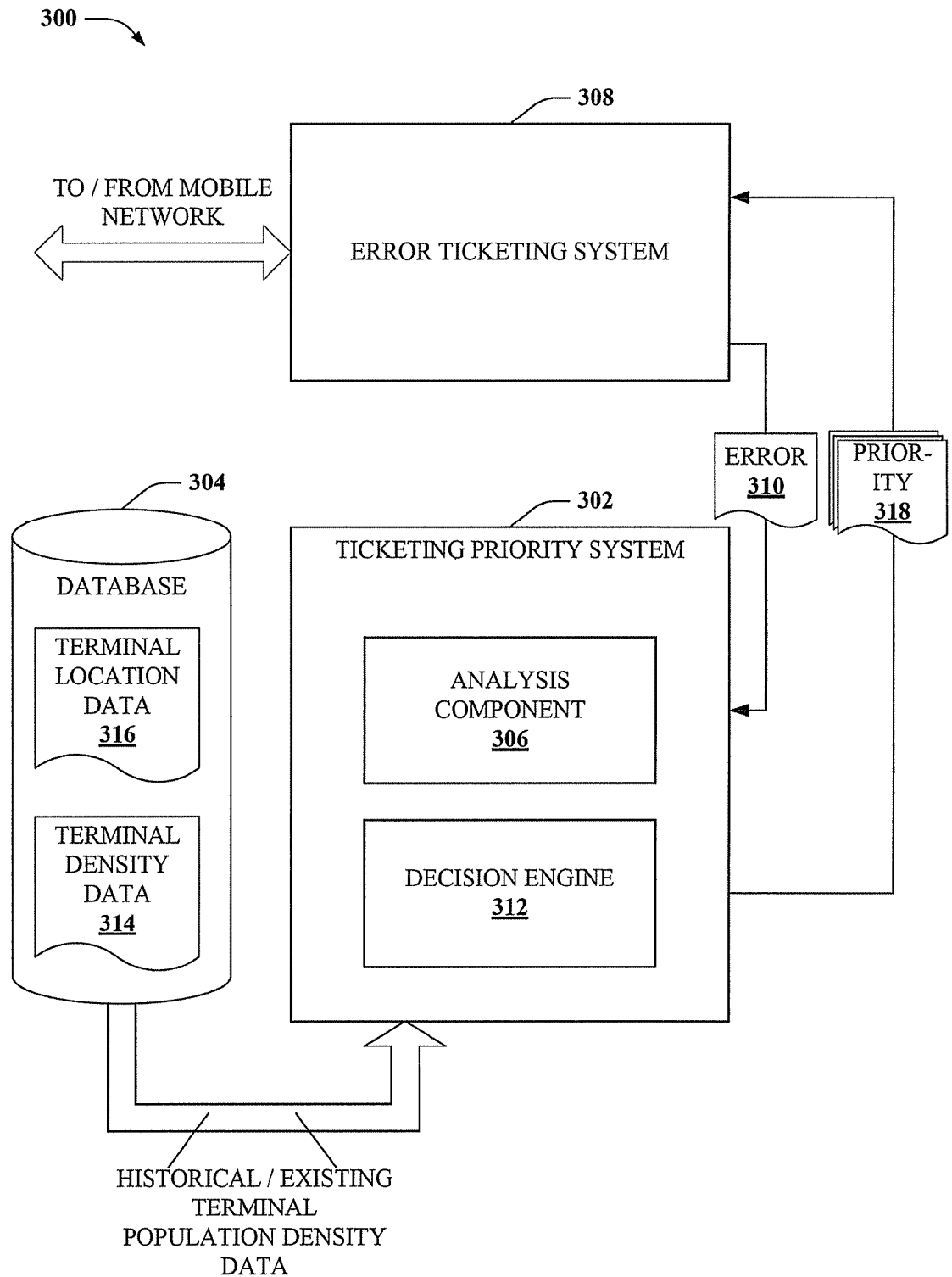
FIG. 3 illustrates a block diagram of an example system that generates predetermined sector repair priorities based on historic terminal density information.

FIG. 3 illustrates a block diagram of a sample system 300 that provides maintenance functionality for a mobile network according to still other aspects of the subject disclosure. Particularly, system 300 can utilize real-time and historic data to generate repair priorities for network base stations affected by a service outage. Historic data can be generated over time by monitoring and recording conditions associated with the network, whereas real-time data can be compiled on an event-by-event basis.

System 300 can comprise a ticketing priority system 302 communicatively connected with a database 304, and an error ticketing system 308. Error ticketing system 308 is communicatively connected to a mobile network, and is configured to receive service outage information from the mobile network. In response to a service outage, error ticketing system 308 generates an electronic error notification 310 identifying network equipment (e.g., cell tower(s), base station(s), sector(s), etc.) associated with the service outage. The electronic error notification 310 is forwarded to ticketing priority system 302.

In response to receiving electronic error notification 310, ticketing priority system 302 can receive historic terminal population density data 314 maintained by database 304. Additionally, analysis component 306 can trigger database 304 to acquire contemporaneous terminal location data 316 (e.g., from position engine 106 of FIG. 1, supra), and analyze the contemporaneous data to generate existing terminal population density data as well. The historic and existing terminal population density data can be forwarded to ticketing priority system 302.

A decision engine 312 can receive the historic and existing terminal population density data. Additionally, decision engine 312 can acquire data indicative of coverage overlap in or near affected sectors, as well as signal characteristics of nearby network equipment. Utilizing this information, decision engine 312 can predict changes in network loading at network equipment in a vicinity of the service outage, and estimate changes in a set of performance metrics for the network equipment and affected terminals. From these changes, a set of repair scores for base stations involved in the service outage is generated by decision engine 312, which are output to error ticketing system 308 in response to the electronic error notification 310. Error ticketing system 308 can then issue repair tickets for these base stations and include respective repair scores with the repair tickets. Accordingly, respective repair tickets include a quantified repair priority reflecting impact on network or subscriber services associated with the service outage, as described herein.

Figure 4:
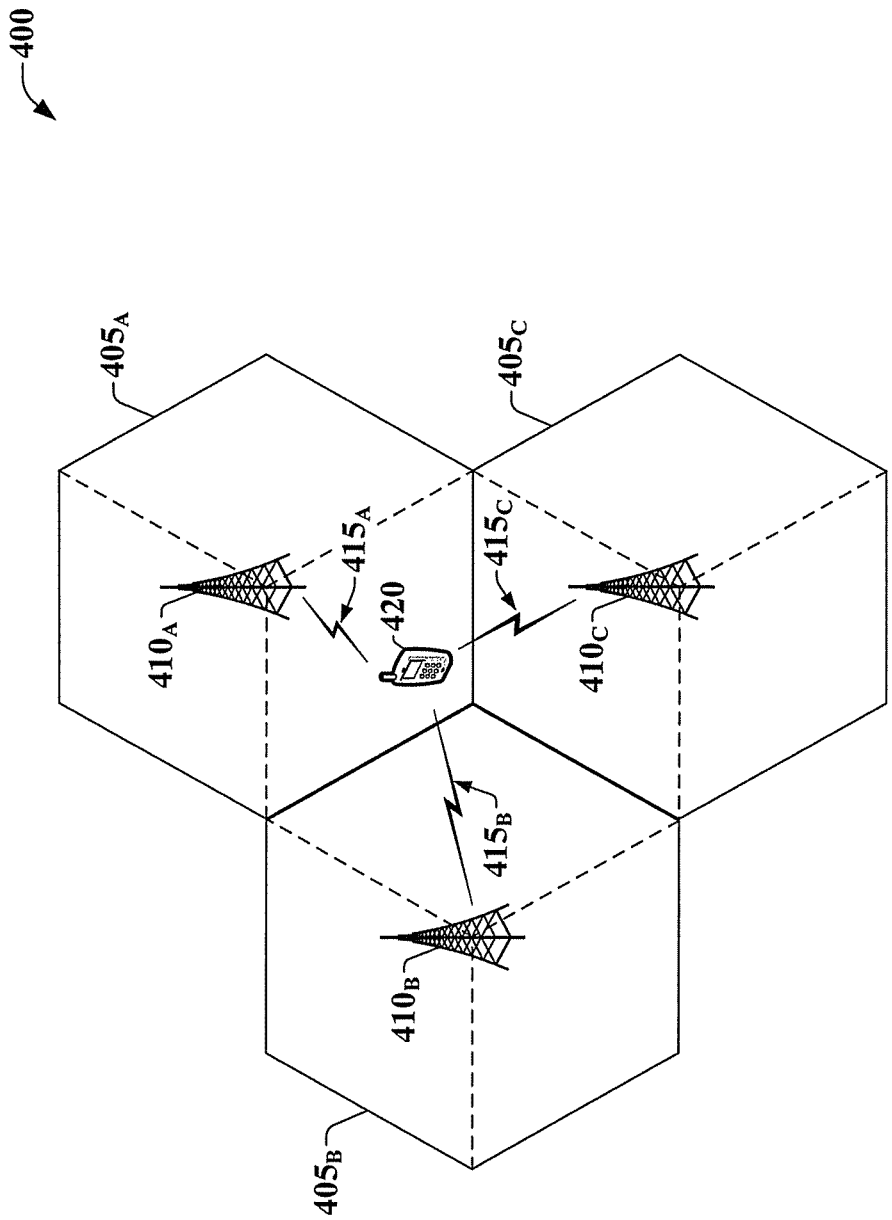
FIG. 4 depicts a diagram of an example cellular network deployment in which a service outage can affect surrounding network infrastructure.

FIG. 4 depicts a diagram of an example wireless environment 400 according to further aspects of the subject disclosure. Wireless environment 400 provides an illustration of a typical environment in which a service outage in one or more network sectors can affect surrounding network equipment. As depicted, wireless environment 400 includes three network cells $405_A$, $405_B$, and $405_C$ (referred to collectively as network cells 405). Each of network cells 405 are associated with a radio tower $410_A$, $410_B$, and $410_C$ (collectively, radio towers 410) having a set of wireless communication equipment (e.g., base stations). Each of network cells 405 are depicted by respective hexagons that indicate a geographic area over which respective radio towers 410 are expected to provide wireless service. In addition, each network cell 405 is sub-divided by three dashed lines into sectors. The sectors represent a portion of the geographic area of respective network cells 405, and can be served by subsets of wireless communication equipment mounted on each of the radio towers 410. Sectorization can be useful in dividing terminals within a cell among distinct cell equipment allocated for those sectors, or for providing directional wireless communications (e.g., utilizing beam forming or beam shaping techniques), or the like.

In the present context, sectorization is relevant in that respective sectors are often associated with respective network hardware equipment. Where a service outage affects a given sector of network cell $405_B$, for instance, the network hardware equipment serving network cell $405_B$ can often be identified separate from other network hardware equipment on radio tower $405_B$. This can increase accuracy and resolution of network troubleshooting mechanisms (e.g., repair tickets), by identifying particular sectors experiencing an outage, as well as the equipment associated with those sectors.

As depicted, a subscriber terminal 420 within wireless environment 400 can observe wireless signals $415_A$, $415_B$, $415_C$ (collectively, wireless signals 415) from each of network cells 405. Further, it is to be understood that each of wireless signals 415 can be measured at subscriber terminal 420 as having different signal characteristics, such as signal strength or power, and so on. Generally, subscriber terminal 420 is configured to register with the cell 405 exhibiting the most favorable signal characteristics. Based on this configuration, knowledge of the location of subscriber terminal 420 and signal characteristics in that location can often be used to predict what radio tower 410 subscriber terminal 420 will register with.

In the event of a service outage in wireless environment 400, one or more wireless signals 415 can be impacted, potentially affecting wireless service to subscriber terminal 420. If, for instance, wireless signal $415_C$ is reduced in strength or unavailable due to the service outage, subscriber terminal 420 may only observe two wireless signals, $415_A$ and $415_B$. If currently registered with either cell $405_A$ or $405_B$ associated with either of these latter signals, subscriber terminal 420 may not experience observable impact to services, since wireless environment 400 includes only a single subscriber terminal 420. However, in the case where other subscriber terminals are present that were formerly registered at cell $405_C$, some of those terminals may attempt to register with a cell serving subscriber terminal 420, consuming some wireless resources at that cell. This could cause an indirect impact on services available for subscriber terminal 420, even though the cell serving subscriber terminal 420 is not involved in the service outage.

Continuing the previous example, if subscriber terminal 420 had previously been registered with cell $405_C$ prior to the service outage, subscriber terminal 420 will be impacted at least temporarily by the outage. As wireless signal $415_C$ loses power or becomes undetectable altogether, subscriber terminal 420 will search for other signals and attempt to register with cells transmitting one or more of those signals. The location of subscriber terminal 420 is one factor affecting whether another such signal is available for service. Thus, again by knowing this location, it can be feasible to predict a likelihood that subscriber terminal 420 will lose service as a result of the service outage (e.g., when unable to register with another cell).

If subscriber terminal 420 is able to detect another wireless signal, the load and resource capacity of a cell associated with that wireless signal can affect whether subscriber terminal 420 will be able to register with that cell. Even where service is obtained, the load and resource capacity of the cell can affect what services are available to subscriber terminal 420. For instance, bandwidth, data throughput, and quality of service are all resource-related characteristics that can noticeably impact services at subscriber terminal 420. Accordingly, determining an impact of the service outage affecting cell $405_C$ can at least in part involve knowledge of loading and capacity of cells $405_A$ and $405_B$, which in turn is at least in part dependent on how many terminals formerly served by cell $405_C$ attempt to obtain service at these cells. Thus, knowledge of terminal location, and particularly terminal population density within wireless environment 400, can be useful in predicting changes in cell loading as a result of the service outage, as well as a cell's capacity for servicing the new load.

Figure 5:
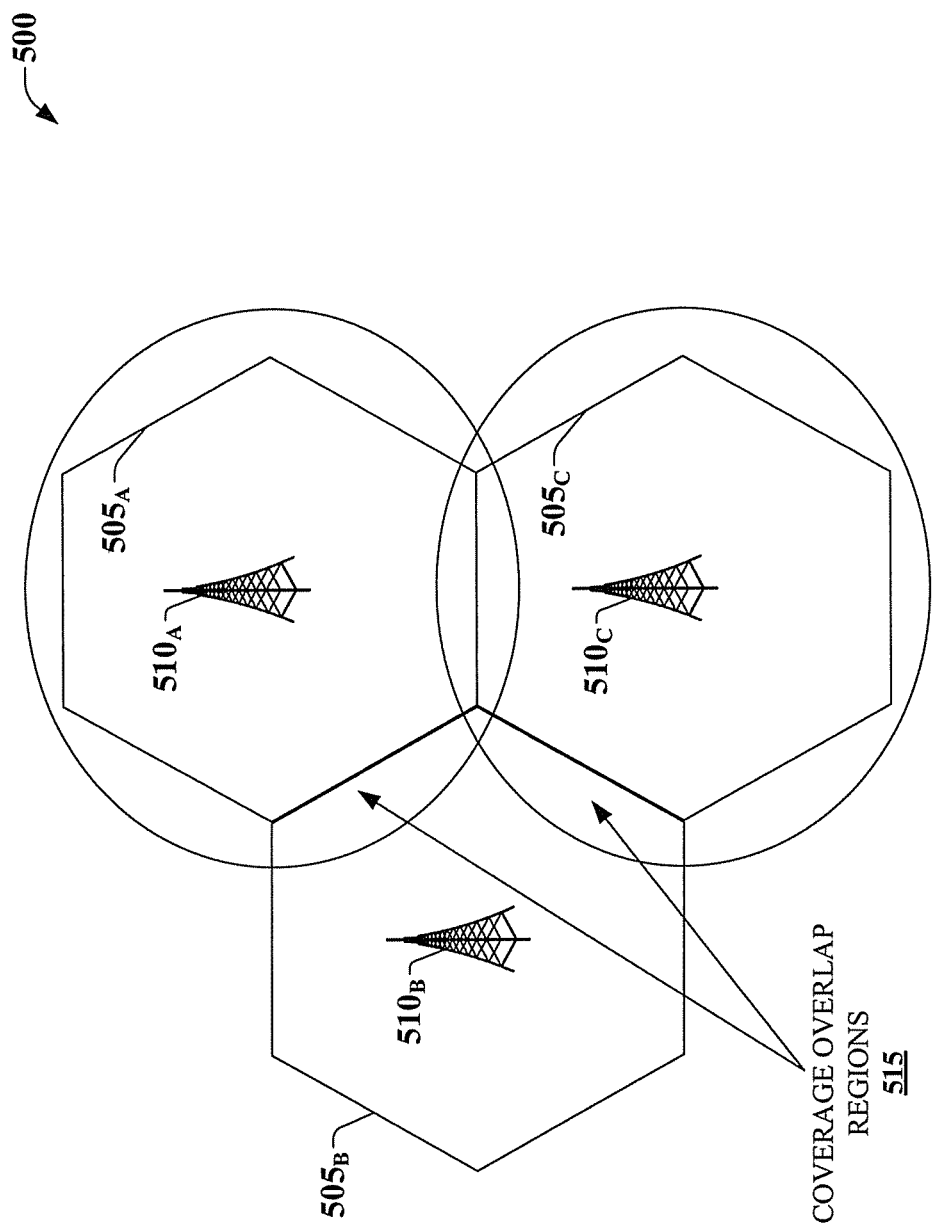
FIG. 5 illustrates a diagram of a sample network deployment showing coverage overlap of neighboring cell sites according to an aspect.

FIG. 5 illustrates a diagram of an example wireless environment 500 according to still other disclosed aspects. Wireless environment 500 illustrates three cells of a wireless network, $505_A$, $505_B$, and $505_C$ (collectively, cells 505) having respective radio towers $510_A$, $510_B$, $510_C$ (collectively, radio towers 510) for providing wireless communication services within the respective cells 505. Wireless environment 500 also indicates two example coverage overlap regions 515, for which radio equipment of cell $505_A$ and cell $505_B$ overlap (for illustrative purposes) at least partially with that of surrounding cells.

In at least one aspect of the subject disclosure, coverage overlap regions 515 of a mobile network can be analyzed and quantified for a wireless network, and quantified information pertaining to the coverage overlap regions stored in a database. Coverage overlap can be characterized, for instance, by analyzing signal characteristics of radio towers 510 at different locations within wireless environment 500, and determining effective range of communication for radio towers 510. As another example, coverage overlap can be characterized by mapping historic call locations of terminals registered with respective cells 505 as another mechanism for determining respective effective ranges of communication for cells 505. Other mechanisms for characterizing coverage overlap of neighboring mobile network cells known in the art or made known to one of skill in the art by way of the context provided herein, are considered within the scope of the present disclosure.

In the event that a service outage occurs at one or more cells of wireless environment 500, terminals within an affected cell can seek coverage in nearby cells. For instance, where cell $505_B$ is experiencing communication failure, terminals within cell $505_B$ can attempt to access cell $505_A$ or $505_C$ instead. Terminals located within a coverage overlap region 515 of one or more of these cells may be able to register onto the mobile network at these cells. Additionally, terminals outside these coverage overlap regions 515 might experience temporary loss of service, or intermittent service. This reasoning could be used to predict loss of coverage for cell $505_B$ during the service outage, in the event that location information for terminals within cell $505_B$ is known. Thus, terminal location data as described herein could be used in conjunction with characterized coverage overlap regions 515 to estimate increased loading on cells $505_A$ and $505_C$, by identifying a number of terminals located within or near the coverage overlap regions 515. Specifically, those terminals within a coverage overlap region 515 can be assumed to be served by cell $505_A$ or $505_B$.

In addition to the foregoing, cell loading information can also be used to predict potential loss of service as a result of the service outage at cell $505_B$. For instance, capacity and current load of network cells (e.g., cells $505_A$ and $505_C$) are generally known or can be determined by a mobile network. If a number of terminals within coverage overlap regions 515 does not exceed respective total capacities of cells $505_A$ and $505_C$, it can be assumed that these terminals will not experience loss of service (though quality of service or data throughput may be impacted by specific resource availability and utilization at those cells). If, on the other hand, the number of terminals within a coverage overlap region 515 exceeds total capacity of one of the cells, a number or percentage of terminals likely to experience loss of service can be determined. As described herein, this number or percentage can be a relevant performance metric for wireless environment 500, and used to score a priority for repairing cell $505_B$ (optionally along with other metrics, such as data throughput or quality of service for respective terminals, total loading of cells $505_A$, $505_C$, or the like).

Figure 6:
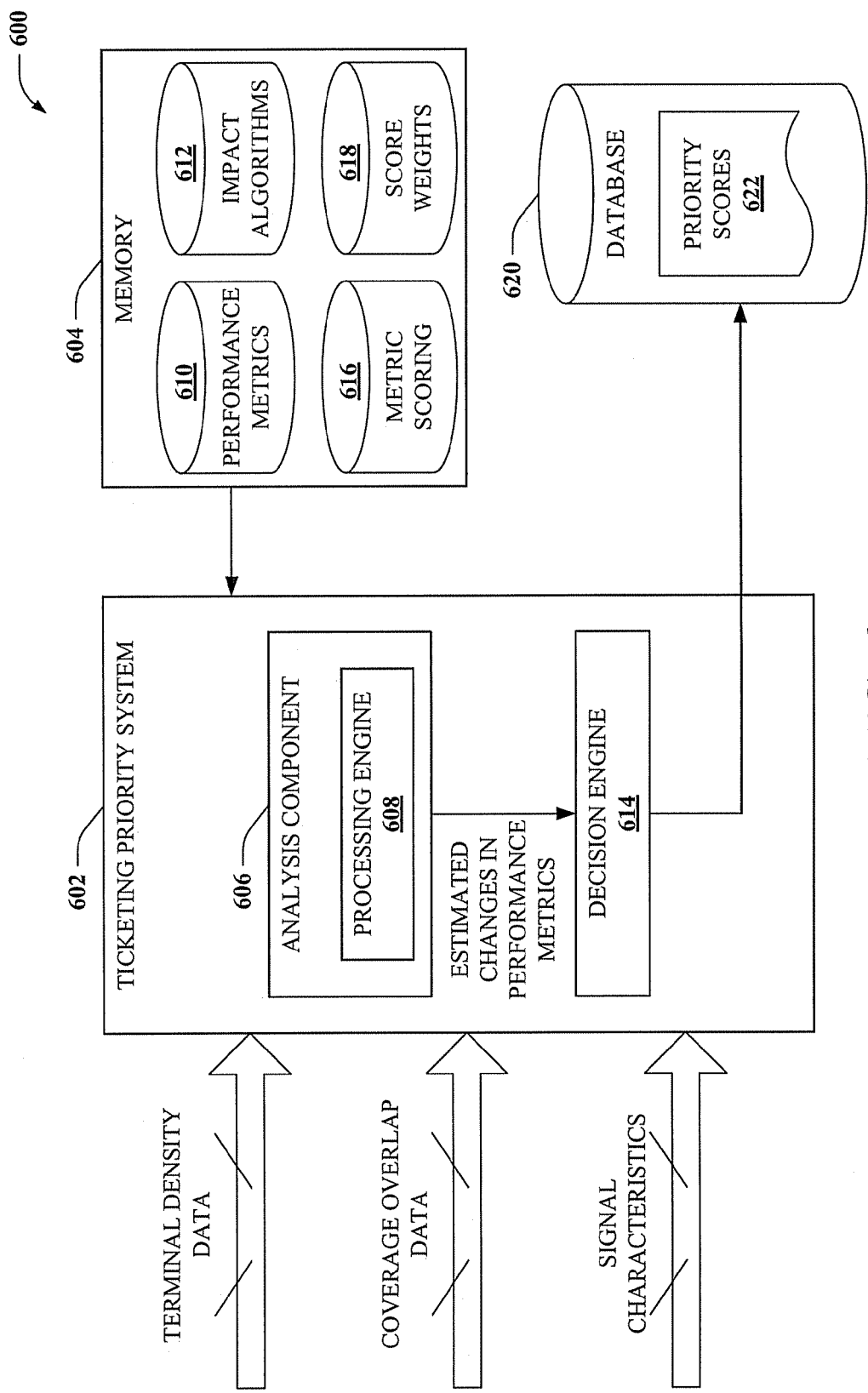
FIG. 6 depicts a block diagram of an example ticketing priority system that generates and updates sector priority scores based on terminal location data.

FIG. 6 illustrates a block diagram of an example system 600 according to one or more further aspects of the subject disclosure. System 600 can be utilized to automate prioritization of base station repair tickets, as described herein. The prioritization can be updated over time and maintained for on-demand use of a mobile network.

System 600 can comprise a ticketing priority system 602 configured to analyze objective data pertaining to conditions of a mobile network and a dynamic population of mobile terminals served by the mobile network, and generate a ranking system for subsets of the mobile network. Particularly, the ranking system can reflect impact of respective subsets of the mobile network on overall network performance, and subscriber experience. Moreover, network data pertinent to the ranking system can be monitored over time for identifiable changes. System 600 can update the ranking system in response to identified changes, resulting in a ranking system that reflects real-time conditions in a wireless network.

Network performance and subscriber experience can be characterized by ticketing priority system 602 with a set of algorithms stored in memory 604. In at least one aspect of the subject disclosure, the algorithms can be configured by a service provider, enabling data model characterization of network performance and subscriber experience, as well as estimated impact on these data models to reflect customer service goals of the service provider. Thus, system 600 can be customized at least in part by configuration of these characterization algorithms.

Ticketing priority system 602 can comprise an analysis component 606 configured to receive, access, generate, etc., data from a mobile network. This data can include terminal density data, coverage overlap data, signal characteristics (e.g., signal strength, signal scattering, signal interference, etc.), or the like, pertinent to sectors of the mobile network. Utilizing the data and performance metrics 610 stored in memory 604, analysis component 606 can characterize network performance at a given point in time. Particularly, performance metrics 610 can include metrics affecting subscriber experience, imbuing the characterization of network performance with factors related to and reflective of subscriber service experience. Further, this data can be re-acquired over time to monitor changes in the data and re-characterize the network performance.

Ticketing priority system 602 can receive a notification of a communication error or service outage from the mobile network, and respond with a suitable repair priority for the error/outage. The repair priority is determined at least in part on impact to network performance and subscriber services. To this end, ticketing priority system 602 can further comprise a processing engine 608 configured to estimate an impact on a set of network performance metrics for a region affected by a communication error or service outage. This region can include one or more base stations identified by the notification, or a range of base stations surrounding those identified. Particularly, processing engine 608 can estimate the impact by analyzing signal strength and coverage overlap information for base stations within the region, coupled with location data for mobile terminals within or near this region. The estimation can be accomplished by referencing this data to a set of impact algorithms 612 stored in memory 604. This location data can be historic data, monitored and maintained over time by ticketing priority system 602, or real-time data captured in response to the notification, or a combination thereof. In at least one aspect, set of impact algorithms 612 can include service provider-configured functions for establishing repair priorities in response to changes in network performance conditions affecting subscriber terminals.

The following operational example is provided to illustrate operation of ticketing priority system 602 given a particular set of impact algorithms 612. For this example, executing impact algorithms 612 can comprise: estimating a percentage of the dynamic population of terminals that will receive coverage from nearby base stations in response to a service error, and assigning a priority score to this percentage, estimating change in voice quality to the dynamic population of terminals in response to the service error, and assigning a second priority score to the change in voice quality, estimating a change in data throughput to the dynamic population of terminals in response to the service error and assigning a third priority score to the change in data throughput, and estimating changes in loading at the related base station in response to the service error, and assigning a fourth priority score to the changes in loading. Respective priority scores can be obtained by comparing the estimated changes in the above metrics to metric scoring 616 (e.g., a look-up table) stored in memory 604. The impact on network performance is obtained by combining the priority score, second priority score, third priority score and fourth priority score. In at least one aspect of the subject disclosure, one or more of the priority scores can be given service provider-configurable score weights 618 in estimating the impact on network performance (e.g., where respective weights incorporate service provider priorities in the above performance metrics).

Aggregated priority scores are stored at 622 in database 620. These priority scores 622 can be output by decision engine 614 in response to the notification of network error, or can be simply made accessible to a repair ticketing system for ticket prioritization. Further, these priority scores 622 can be updated by ticketing priority system 602 periodically, in response to an error as described above, or in response to changes in monitored terminal density data, or the like. Timely updating can help to provide priority scores 622 that accurately reflect dynamic conditions within a mobile network.

Further to the above, advance prioritization of network repair tickets can reflect dynamic, real-time conditions when a rich source of historical terminal population data is available. To this end, analysis component 612 can acquire and re-acquire real-time location data for the dynamic population of mobile terminals associated with the mobile network, and update terminal location density statistics over time. Further, processing component 612 can re-analyze terminal location density data to identify statistically significant changes in terminal density patterns at various times or time intervals. Where significant changes are identified, repair ticket priorities scores 622 can be updated or modified to reflect a terminal density that is relevant to a time in which an outage occurs. Thus, particular network sectors or cells can be associated with a set of repair ticket priorities, the set including respective ticket priorities pertinent to a statistically significant time, time frame or time interval. Examples include respective ticket priorities for different times of day (e.g., business hours, evening hours, morning hours), day of the week (e.g., weekdays, weekends, Monday, Thursday, etc.), season of the year, and so on, according to at least one aspect disclosed herein.

According to another particular aspect of the subject disclosure, terminal density data can be derived from sub-sector location information of a dynamic population of mobile terminals operating on the mobile network. Sub-sector location data can have a resolution (e.g., grid size) of 500 square meters or less, 100 square meters or less, 70 square meters or less, or some other suitable resolution. Moreover, sub-sector location data can be compiled for a mixed population of location-aware terminals and non-location aware terminals. It should be appreciated that statistical location error for location aware terminals can be much less than for non-location aware terminals (e.g., 5-10 meters or less, as compared with 100 meters or less, 70 meters or less, etc.), and this information can be stored and utilized by analysis component 606 in determining the terminal density data for the mobile network. Generally, the more accurate the location information, the more accurate the estimates on performance metrics by processing engine 608. Thus, the subject disclosure contemplates advancements in mobile terminal position determination to be applicable and pertinent to the various aspects described herein.

The aforementioned systems have been described with respect to interaction between several systems, components or communication interfaces. It should be appreciated that such systems and components can include those components or sub-components specified therein, some of the specified components or sub-components, or additional components. For example, a system could include database 104, position engine 106, ticketing priority system 602 and memory 604, or a different combination of these or other entities. Sub-components could also be implemented as modules communicatively coupled to other modules rather than included within parent modules. Additionally, it should be noted that one or more components could be combined into a single component providing aggregate functionality. For instance, event component 208 can include maintenance server 212, or vice versa, to facilitate receiving a notification of error and responding with a base station repair ticket, by way of a single component. The components can also interact with one or more other components not specifically described herein but known by those of skill in the art.

Figure 7:
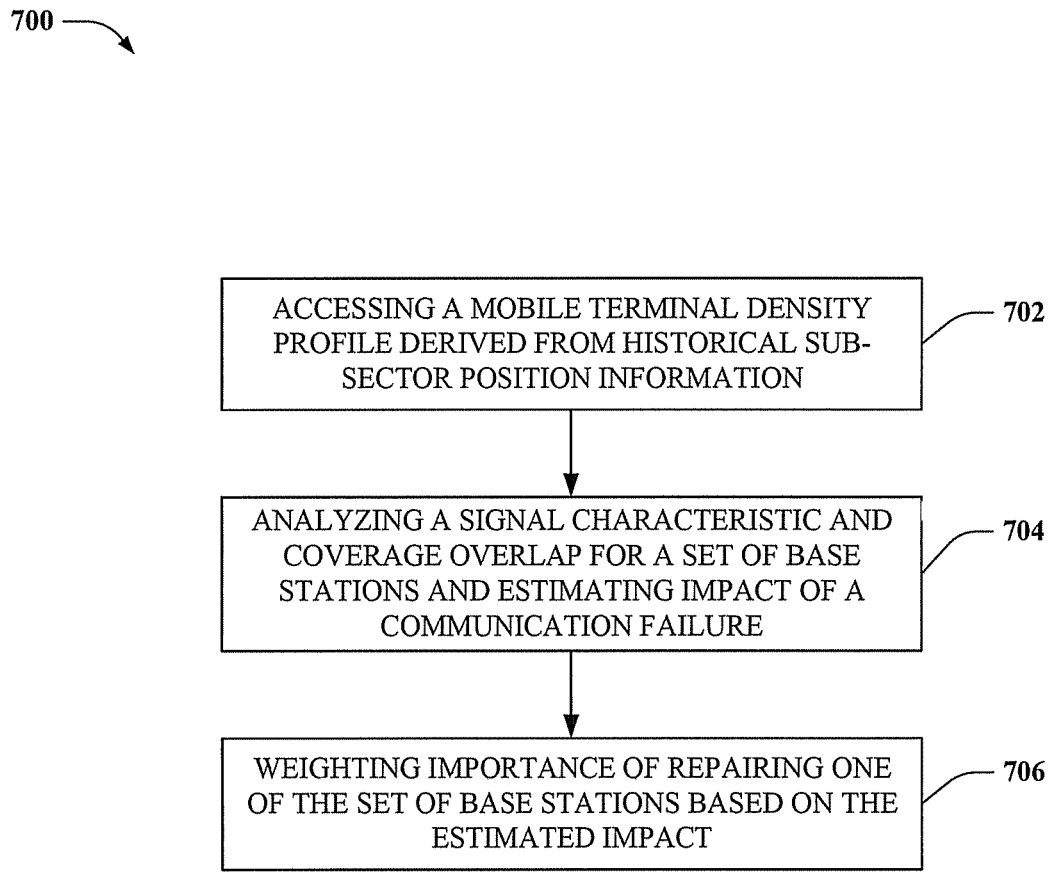
FIG. 7 illustrates a flowchart of an example method for providing priority for network repair tickets in one or more aspects of the subject disclosure.
Figure 8:
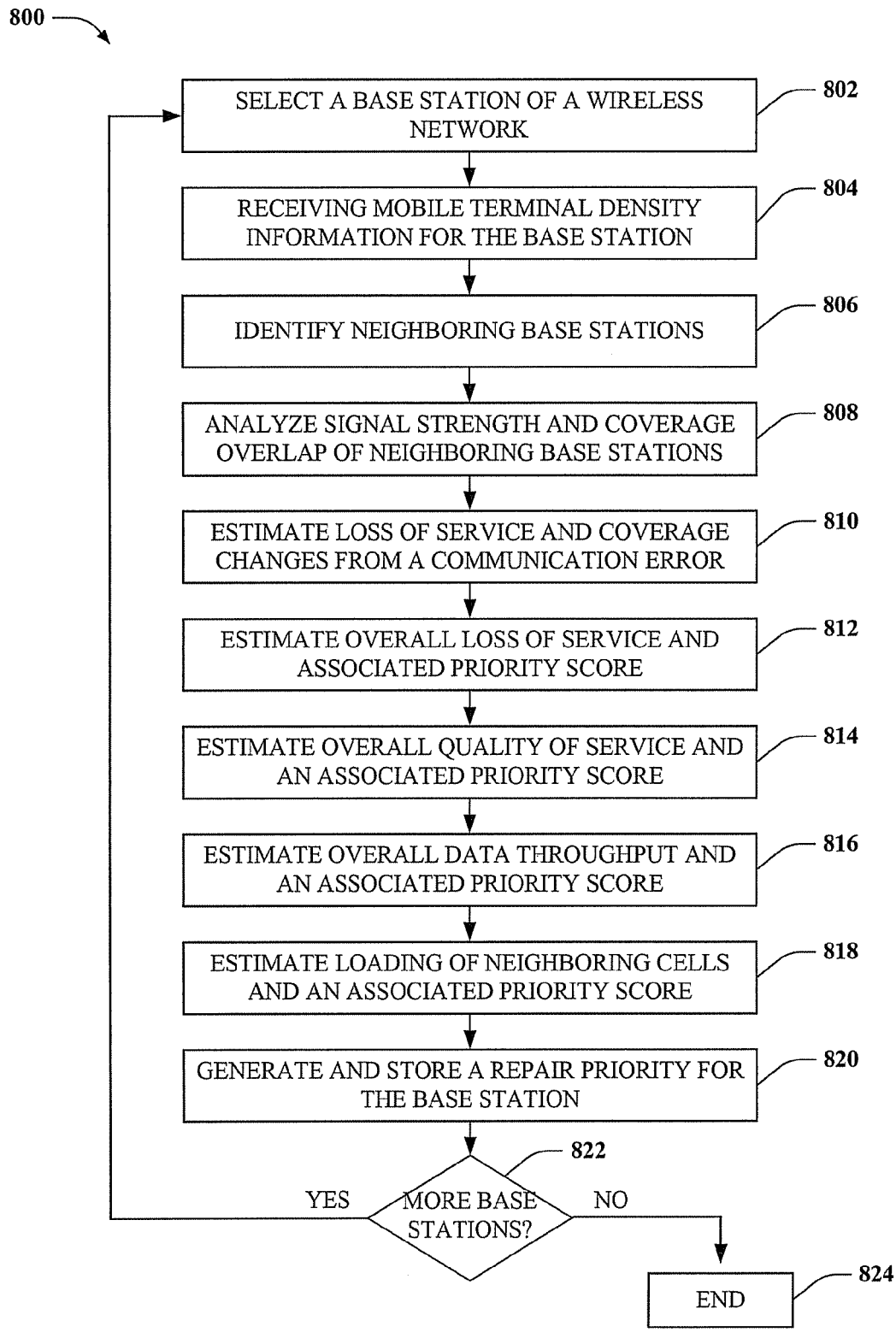
FIG. 8 depicts a flowchart of a sample method for estimating network impact of a service outage and prioritizing repair on the network impact, in an aspect(s).
Figure 9:
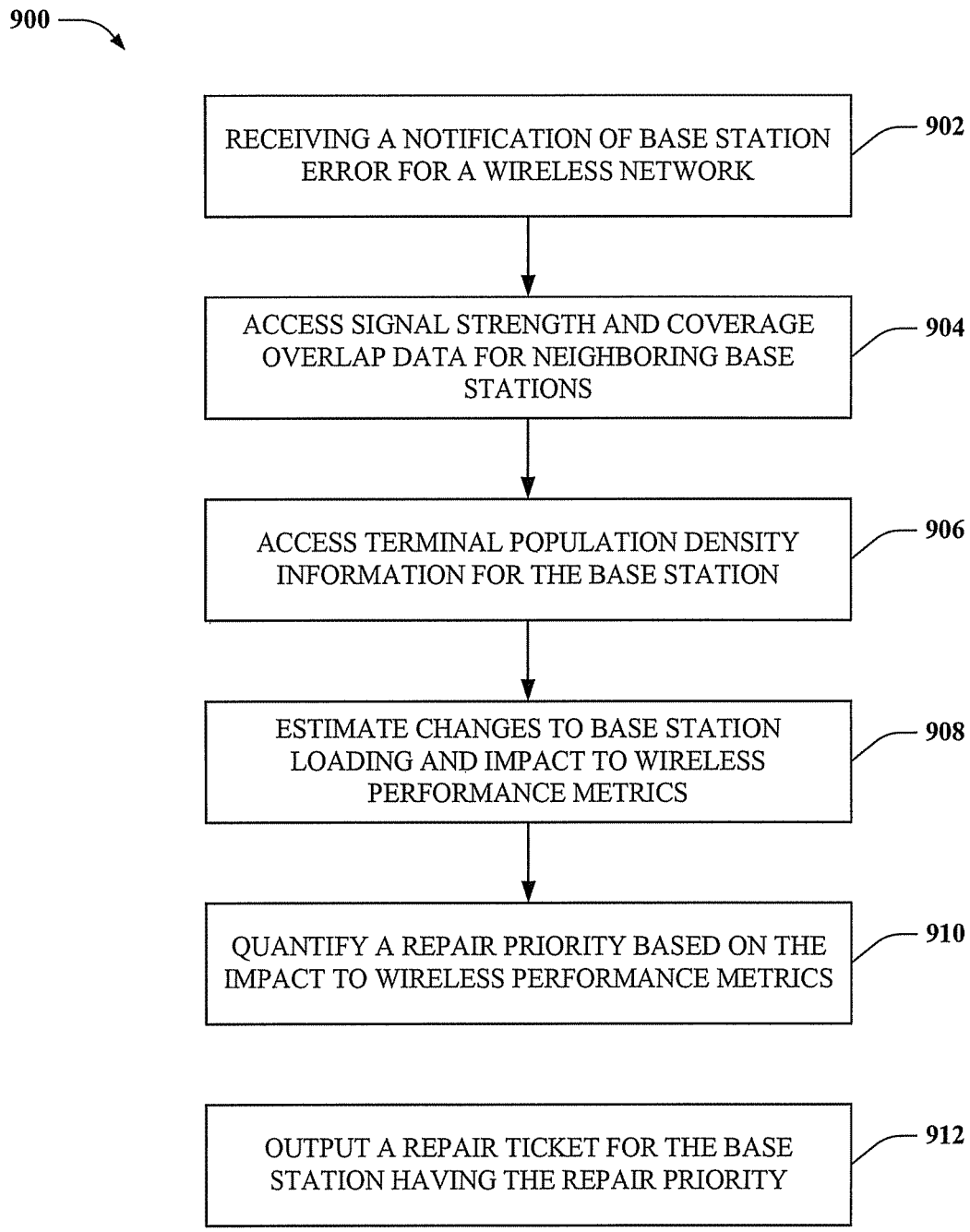
FIG. 9 illustrates a flowchart of an example method for providing real-time sector repair priorities in response to service outage events, in another aspect(s).

FIGS. 7, 8, and 9 illustrate various methods in accordance with one or more of the various embodiments disclosed herein. While, for purposes of simplicity of explanation, the methods are shown and described as a series of acts, it is to be understood and appreciated that the various embodiments are not limited by the order of acts, as some acts may occur in different orders or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the various embodiments. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

FIG. 7 illustrates a flowchart of an example method 700 for prioritizing repair tickets in a mobile network environment according to various aspects of the subject disclosure. At 702, method 700 can comprise accessing a mobile terminal density profile derived from historical position information for mobile terminals operating on a wireless network. The mobile terminal density profile can be derived from location information maintained for a dynamic population of mobile terminals associated with the wireless network. In some aspects, the location information can be sub-sector location information, having minimum feature (e.g., grid) size of less than a sector of the wireless network. Particularly, the minimum feature size can be 500 meters or less, 100 meters or less, 70 meters or less, or even 5-10 meters or less, depending on a location technique(s) utilized for acquiring the location information. In at least one aspect, the location information can be acquired for both location aware and non-location aware mobile terminals operating within the network.

At 704, method 700 can comprise analyzing a signal characteristic and coverage overlap for a set of base stations of the wireless network and estimating impact to mobile terminal service in response to a theoretical communication failure at one of the set of base stations. In a particular aspect, estimating impact to mobile terminal service can further comprise predicting changes in existing cell populations from the mobile terminal density profile and analysis of signal characteristic and coverage overlap. In a further aspect, estimating impact to mobile terminal service can additionally comprise anticipating changes in quality of service, data throughput, cell loading or loss of service, or like metrics or a suitable combination thereof, at least in part from the changes in existing cell populations.

At 706, method 700 can comprise weighting importance of repairing the one of the set of base stations at least in part on the estimated impact to mobile terminal service. For instance, weighting importance of repairing the one of the set of base stations can further comprise ranking the respective anticipated changes in degree of severity and combining the respective rankings. These rankings can be configured by a network service provider, in at least one disclosed aspect, providing flexibility in prioritizing repair tickets based on the service provider's customer service goals.

FIG. 8 illustrates a block diagram of an example method 800 for providing network repair prioritization in advance of a service outage according to still other aspects of the subject disclosure. Method 800 can comprise, at 802, selecting a base station of a wireless network from a set of base stations within the wireless network. At 804, method 800 can comprise receiving mobile terminal density information for the base station. At 806, method 800 can comprise identifying neighboring base stations of the wireless network. At 808, method 800 can comprise analyzing signal strength and coverage overlap of the base station and the neighboring base stations. At 810, method 800 can comprise estimating loss of service and signal coverage changes from a potential communication error affecting the base station. At 812, method 800 can comprise estimating overall loss of service resulting from the potential communication error and an associated repair priority score for the loss of service. At 814, method 800 can comprise estimating overall quality of service for mobile terminals affected by the potential communication error and an associated repair priority score for the quality of service. At 816, method 800 can comprise estimating overall data throughput for mobile terminals affected by the potential communication error and an associated repair priority score for the data throughput. At 818, method 800 can comprise estimating loading of the neighboring base stations resulting from the potential communication error and an associated repair priority score for the loading. At 820, method 800 can comprise generating an overall repair priority for the base station from an aggregate of the repair priority scores, and storing the overall repair priority for the base station. At 822, method 800 can determine whether more base stations exist within the wireless network for repair priority scoring. If so, method 800 can return to reference number 802 to generate repair priority scoring for other base stations of the wireless network. Otherwise, method 800 can end at 824.

FIG. 9 illustrates a flowchart of a sample method 900 for providing real-time repair prioritization for wireless network service outages according to aspects of the subject disclosure. At 902, method 900 can comprise receiving a notification of base station error for a sector(s) of a wireless network. At 904, method 900 can comprise accessing signal strength and coverage overlap data for base stations neighboring the sector(s). At 906, method 900 can comprise accessing terminal population density information for the sector(s) and base stations. At 908, method 900 can comprise estimating changes to base station loading and impact to wireless performance metrics. At 910, method 900 can comprise quantifying a repair priority for the base station error based at least in part on the impact to wireless performance metrics. At 912, method 900 can comprise outputting a repair ticket for the sector(s) having the repair priority.

Figure 10:
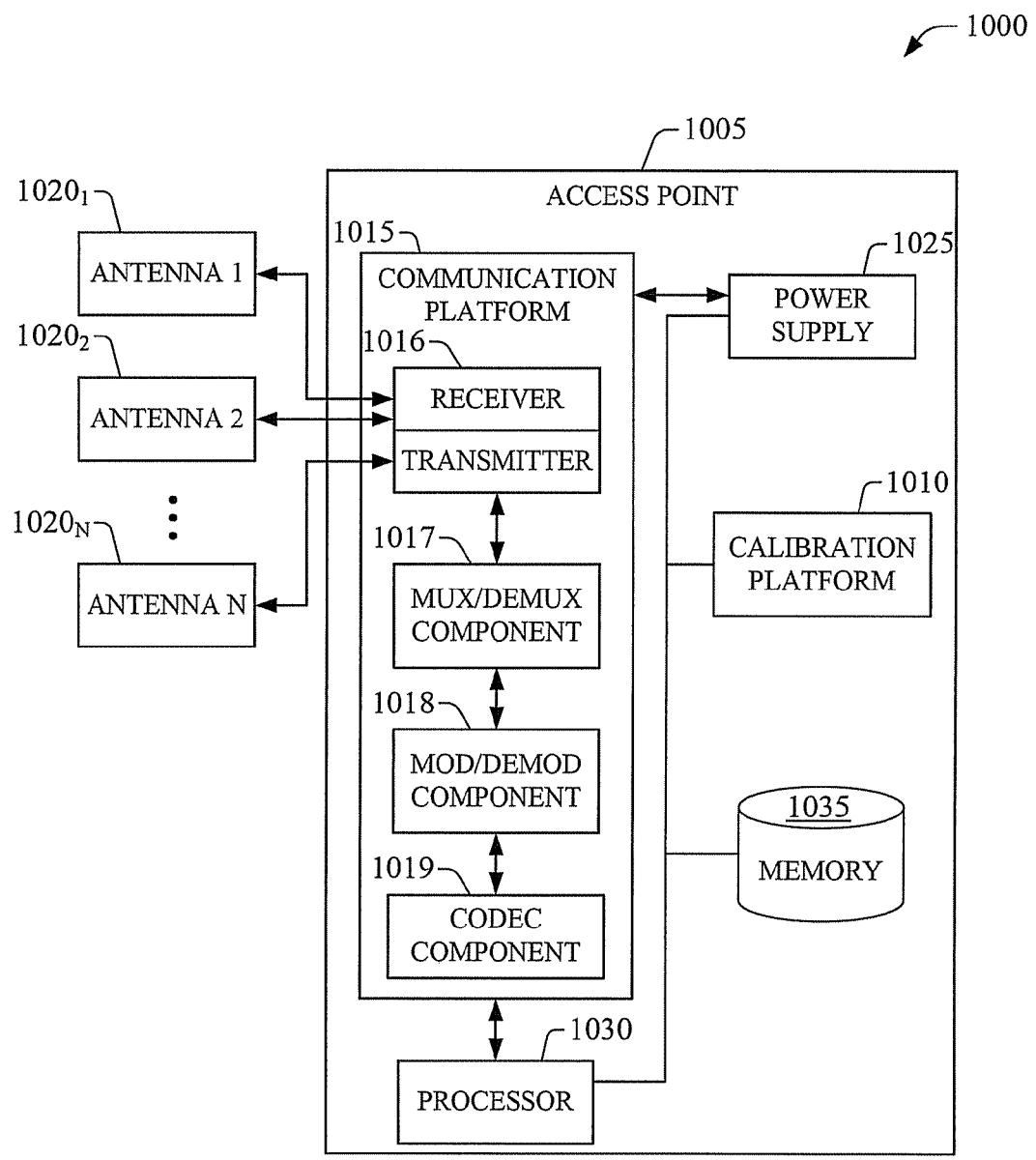
FIG. 10 depicts a block diagram of an example network base station to implement or leverage one or more aspects of the subject disclosure.

FIG. 10 illustrates a block diagram of an example embodiment of an access point to implement and exploit one or more features or aspects of the disclosed subject matter. In embodiment 1000, AP 1005 can receive and transmit signal(s) (e.g., attachment signaling) from and to wireless devices like femto access points, access terminals, wireless ports and routers, or the like, through a set of antennas $1020_1$-$1020_N$ (N is a positive integer). It should be appreciated that antennas $1020_1$-$1020_N$ can embody radio towers 410 or radio towers 510, and are a part of communication platform 1015, which comprises electronic components and associated circuitry that provides for processing and manipulation of received signal(s) and signal(s) to be transmitted. In an aspect, communication platform 1015 includes a receiver/transmitter 1016 that can convert signal (e.g., wireless signals 415) from analog to digital upon reception, and from digital to analog upon transmission. In addition, receiver/transmitter 1016 can divide a single data stream into multiple, parallel data streams, or perform the reciprocal operation. Coupled to receiver/transmitter 1016 is a multiplexer/demultiplexer 1017 that facilitates manipulation of signal in time and frequency space. Electronic component 1017 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1017 can scramble and spread information (e.g., codes) according to substantially any code known in the art; e.g., Hadamard-Walsh codes, Baker codes, Kasami codes, polyphase codes, and so on. A modulator/demodulator 1018 is also a part of communication platform 1015, and can modulate information according to multiple modulation techniques, such as frequency modulation, amplitude modulation (e.g., M-ary quadrature amplitude modulation (QAM), with M a positive integer), phase-shift keying (PSK), and the like. Communication platform 1015 also includes a coder/decoder (codec) component 10110 that facilitates decoding received signal(s), and coding signal(s) to convey.

Access point 1005 also includes a processor 1035 configured to confer functionality, at least in part, to substantially any electronic component in AP 1005. In particular, processor 1035 can facilitate determination of propagation delay information of RF signal, or microwave signal, among communication platform 1015 and antennas $1020_1$-$1020_N$ in accordance with various aspects and embodiments disclosed herein. Power supply 1025 can attach to a power grid and include one or more transformers to achieve power level that can operate AP 1005 components and circuitry. Additionally, power supply 1025 can include a rechargeable power component to ensure operation when AP 1005 is disconnected from the power grid, or in instances, the power grid is not operating.

Processor 1035 also is functionally connected to communication platform 1015 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 1035 is functionally connected, via a data or system bus, to calibration platform 1012 and other components (not shown) to confer, at least in part functionality to each of such components.

In AP 1005, memory 1045 can store data structures, code instructions and program modules, system or device information, code sequences for scrambling, spreading and pilot transmission, location intelligence storage, determined delay offset(s), over-the-air propagation models, and so on. Processor 1035 is coupled to the memory 1045 in order to store and retrieve information necessary to operate and/or confer functionality to communication platform 1015, calibration platform 1012, and other components (not shown) of access point 1005.

Figure 11:
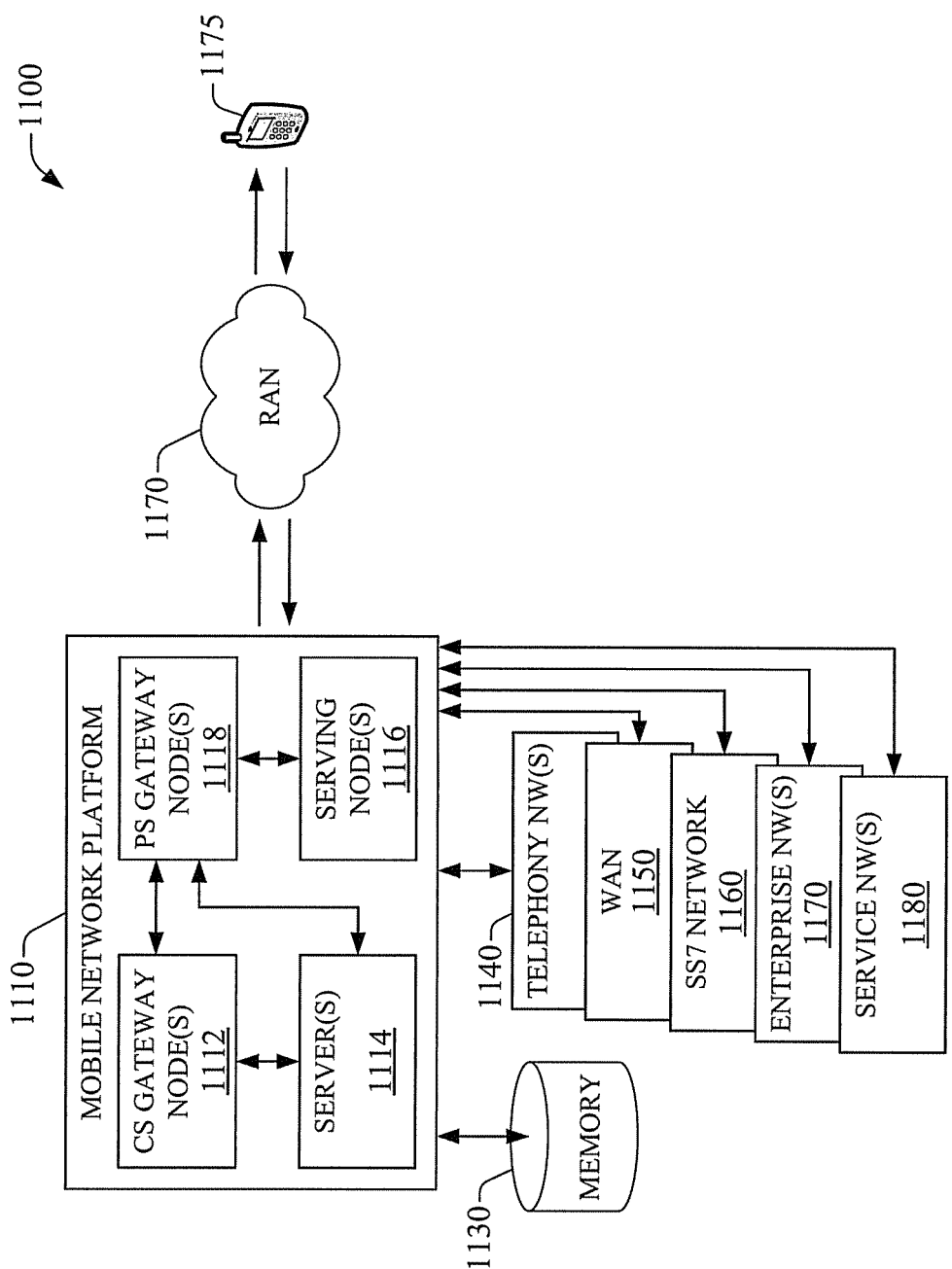
FIG. 11 illustrates a block diagram of a sample mobile network platform to implement or exploit various aspects disclosed herein.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication.

In the disclosed subject matter, in addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications (e.g., location services, online gaming, wireless banking, wireless device management . . . ) that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto cell network(s) (not shown) that enhance wireless service coverage within indoor confined spaces and offload RAN resources in order to enhance subscriber service experience within a home or business environment. Server(s) 1114 can embody, at least in part, ticketing priority system 602 and database 104, as well as various other component(s) disclosed herein It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. In particular, memory 1130 can include contents of memory 604 in example system 600. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170.

It is to be noted that aspects, features, or advantages of the disclosed subject matter described in the subject specification can be exploited in substantially any wireless communication technology. For instance, Wi-Fi, WiMAX, Enhanced GPRS, 3GPP LTE, 3GPP2 UMB, 3GPP UMTS, HSPA, HSDPA, HSUPA, GERAN, UTRAN, LTE Advanced. Additionally, substantially all aspects of the disclosed subject matter as disclosed in the subject specification can be exploited in legacy telecommunication technologies; e.g., GSM. In addition, mobile as well non-mobile networks (e.g., internet, data service network such as internet protocol television (IPTV)) can exploit aspects or features described herein.

Various aspects or features described herein can be implemented as a method, apparatus or system, or article of manufacture using standard programming or engineering techniques. In addition, various aspects or features disclosed in the subject specification also can be effected through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of systems and methods that provide advantages of the disclosed subject matter. It is, of course, not possible to describe every conceivable combination of components or methodologies for purposes of describing the disclosed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a memory to store executable instructions; and
   a processor, coupled to the memory, that facilitates execution of the executable instructions to perform operations, comprising:
      initiating storage of terminal device density information determined at least in part from sub-sector location data for a population of terminal devices associated with a base station device of a wireless network; and
      generating estimate data representing an estimate of defined network impact in response to a service error related to the base station device being determined to have occurred, wherein the estimate of defined network impact is determined at least in part from the terminal device density information, the sub-sector location data and changes to a set of network performance metrics for the base station device and a second base station device associated with the base station device in response to the service error; and
      estimating an impact on a second set of network performance metrics for the second base station device caused by the service error at the base station device, wherein the estimating the impact comprises:
         estimating a percentage of the population of terminal devices that will receive coverage from the second base station device in response to the service error, and assigning a priority score to the percentage;
         estimating a first change in voice quality to the population of terminal devices in response to the service error;
         assigning a second priority score to the first change in voice quality;
         estimating a second change in data throughput to the population of terminal devices in response to the service error;
         assigning a third priority score to the second change in data throughput;
         estimating a third change in loading at the second base station device in response to the service error; and
         assigning a fourth priority score to the third change in loading.

2. The system of claim 1, wherein the operations further comprise:
   determining priority data representing a repair priority for the base station device based at least in part on the estimate data; and
   generating score data representing a repair score for the base station device based on the priority data.

3. The system of claim 2, wherein the operations further comprise:
   receiving notification data representing a notification of error pertaining to the base station device; and outputting the score data representing the repair score to a maintenance server device in response to the receiving the notification data.

4. The system of claim 1, wherein the operations further comprise:
   issuing repair ticket data representing a repair ticket for the base station device comprising a repair score that indicates a relative priority for servicing the base station device.

5. The system of claim 1, wherein the operations further comprise:

determining the sub-sector location data for the population of terminal devices at least in part with a timed fingerprint location grid mapped at least for the base station device.

6. The system of claim 5, wherein:
the population of terminal devices includes a location-aware terminal device and a non location-aware terminal device; and
the operations further comprise determining sub-sector location data for the non location-aware terminal device at least in part from signal timing results of the location-aware terminal device.

7. The system of claim 1, wherein the second base station device is further associated with a coverage area at least in part overlapping a coverage area of the base station device.

8. The system of claim 1, wherein the second base station device is further associated with a terminal load that is impacted in response to the service error.

9. The system of claim 1, wherein the terminal density information relates to sub-sector location information for respective terminal devices of the population of terminal devices.

10. The system of claim 1, wherein the operations further comprise:
storing historical terminal device density information for the population of terminal devices as a function of time; and
updating stored historical terminal device density information with subsequent information.

11. The system of claim 1, wherein the estimating the impact is at least in part based on signal strength and coverage overlap for the base station device and the second base station device, and historical sub-sector location information of the population of terminal devices.

12. The system of claim 1, wherein the estimating the impact further comprises weighting and combining the priority score, the second priority score, the third priority score and the fourth priority score.

13. A method, comprising:
accessing, by a system comprising a processor, profile data representing a mobile terminal device density profile derived from historical position information for mobile terminal devices operating on an interoperable set of wireless network devices of a wireless network;
analyzing, by the system, a signal characteristic and coverage overlap for a base station device of a set of base station devices of the wireless network;
determining, by the system, resource information for at least the base station device of the set of base station devices, and predicting a loss of service event at the base station device of the set of base station devices in response to the resource information;
determining, by the system, impact data estimating an impact to mobile terminal device service in response to predicting the loss of service event at the base station device of the set of base station devices;
determining, by the system, importance data representing an importance of repairing the base station device of the set of base station devices at least in part on the impact data;
determining, by the system, sub-sector location data for the mobile terminal devices at least in part with a timed fingerprint location (TFL) grid, comprising a minimum grid size that represents a geographic area of substantially 500 meters or less, mapped at least for the base station device of the set of base station devices; and determining, by the system, sub-sector location data for a non location-aware mobile terminal device of the mobile terminal devices at least in part from signal timing results of a location-aware mobile terminal device of the mobile terminal devices.

14. The method of claim 13, wherein the determining the impact data further comprises predicting changes in existing cell populations based on the profile data representing the mobile terminal device density profile and a set of signal characteristics and coverage overlap for the set of base station devices.

15. The method of claim 13, wherein the determining the impact data further comprises:
predicting condition changes in quality of service, data throughput, cell loading and loss of service at least in part from the changes in existing cell populations;
determining importance data representing an importance of repairing the base station device of the set of base station devices further comprises ranking the condition changes in degree of severity resulting in respective rankings; and
combining the respective rankings.

16. The method of claim 13, further comprising generating, by the system, score data representing a repair score for the base station device from the importance data.

17. A system, comprising:
a memory to store executable instructions; and
a processor, coupled to the memory, that facilitates execution of the executable instructions to perform operations, comprising:
accessing density profile data representing a density profile derived from historical position information for mobile terminal devices operating on a wireless network or a network device related to the wireless network;
processing respective signal characteristics and coverage overlap for a set of base station devices and, using the density profile data, determining impact data representing an impact to a mobile terminal device service in response to a communication failure of a base station device of the set of base station devices being determined to have occurred;
determining importance data representing an importance of repairing the base station device associated with the communication failure at least in part on the impact data representing the impact to the mobile terminal device;
determining sub-sector location data for the mobile terminal devices at least in part with a timed fingerprint location (TFL) grid, comprising a minimum grid size that represents a geographic area of substantially 500 meters or less, mapped at least for the base station device of the base station devices; and
determining sub-sector location data for a non location-aware mobile terminal device of the mobile terminal devices at least in part from signal timing results of a location-aware mobile terminal device of the mobile terminal devices.

18. The method of claim 16, further comprising receiving, by the system, notification data representing a notification of error pertaining to the base station device, and outputting the score data representing the repair score to a maintenance server device in response to the receiving the notification data.

19. The system of claim 17, wherein the operations further comprise generating estimate data representing an estimate of defined network impact in response to a service error related to the base station device being determined to have occurred, wherein the estimate of defined network impact is determined at least in part from density profile data, the sub-sector location data and changes to a set of network performance metrics for the base station device and a second base station device associated with the base station device in response to the service error.

20. The system of claim 19, wherein the operations further comprise estimating an impact on a second set of network performance metrics for the second base station device caused by the service error at the base station device.

* * * * *